US007463275B2

(12) United States Patent
Nakamura et al.

(10) Patent No.: US 7,463,275 B2
(45) Date of Patent: Dec. 9, 2008

(54) LIGHT SOURCE FOR IMAGE WRITING APPARATUS AND PRODUCTION METHOD FOR LIGHT SOURCE

(75) Inventors: Tetsuroh Nakamura, Takaraduka (JP); Ken-ichi Masumoto, Hirakata (JP); Yuji Toyomura, Fukuoka (JP); Takafumi Hamano, Chikushi-gun (JP); Akira Gyotoku, Miyaki-gun (JP); Hideki Maruyama, Chikushino (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 10/533,392

(22) PCT Filed: Oct. 27, 2003

(86) PCT No.: PCT/JP03/13736

§ 371 (c)(1),
(2), (4) Date: Apr. 29, 2005

(87) PCT Pub. No.: WO2004/039595

PCT Pub. Date: May 13, 2004

(65) Prior Publication Data

US 2006/0001731 A1 Jan. 5, 2006

(30) Foreign Application Priority Data

Oct. 30, 2002 (JP) ............................ 2002-315652
Oct. 30, 2002 (JP) ............................ 2002-315653
Oct. 30, 2002 (JP) ............................ 2002-315654

(51) Int. Cl.

| | |
|---|---|
| ***B41J 2/435*** | (2006.01) |
| ***B41J 2/47*** | (2006.01) |
| ***B41J 15/14*** | (2006.01) |
| ***G02B 27/30*** | (2006.01) |
| ***G02B 26/00*** | (2006.01) |

(52) U.S. Cl. ...................... 347/224; 347/225; 347/241; 347/239; 359/641; 359/237

(58) Field of Classification Search ................ 347/224, 347/225, 241, 239; 359/641, 237
See application file for complete search history.

(56) References Cited

U.S. PATENT DOCUMENTS 5,452,385 A * 9/1995 Izumi et al. .................. 385/37

(Continued)

FOREIGN PATENT DOCUMENTS

| | | |
|---|---|---|
| JP | 4-310981 | 11/1992 |
| JP | 04-310981 A | 11/1992 |
| JP | 05-265363 | 10/1993 |
| JP | 6-202242 | 7/1994 |
| JP | 06-202242 A | 7/1994 |

(Continued)

*Primary Examiner*—Stephen D Meier
*Assistant Examiner*—Sarah Al-Hashimi
(74) *Attorney, Agent, or Firm*—Wenderoth, Lind & Ponack, L.L.P.

(57) ABSTRACT

An image forming apparatus includes a light source provided with converting structure for converting an advancing direction of light emitted from the light source, whereby a direction in which the light source is disposed can be determined regardless of a direction in which light is emitted. The advancing direction of the light emitted from a light emitting element is converted into a direction in which light transmitting structure can transmit the light, so that a luminous intensity on a photosensitive drum can be increased. The light source is designed so as to increase a light emitting area of the light emitting element and condense light emitted therefrom. The light emitting element utilizes a flat luminous unit, which is combined with a light transmitting structure in one optical piece.

16 Claims, 35 Drawing Sheets

U.S. PATENT DOCUMENTS

| | | | | |
|---|---|---|---|---|
| 5,684,523 | A * | 11/1997 | Satoh et al. | 347/247 |
| 5,808,657 | A * | 9/1998 | Kurtz et al. | 347/239 |
| 5,817,447 | A * | 10/1998 | Yip | 430/363 |
| 5,969,747 | A * | 10/1999 | Egan | 347/256 |
| 6,025,863 | A * | 2/2000 | Nakajima et al. | 347/238 |
| 6,320,633 | B1 | 11/2001 | Broer et al. | |
| 6,392,338 | B1 | 5/2002 | Hori et al. | |
| 6,636,252 | B2 * | 10/2003 | Hiraoka | 347/238 |
| 7,042,599 | B2 * | 5/2006 | Yokota et al. | 358/475 |
| 7,154,640 | B2 * | 12/2006 | Ishihara | 358/474 |
| 2001/0026393 | A1 * | 10/2001 | Suzuki et al. | 359/205 |
| 2001/0028223 | A1 | 10/2001 | Kimura | |
| 2005/0248267 | A1 * | 11/2005 | Gyoutoku et al. | 313/506 |

FOREIGN PATENT DOCUMENTS

| | | |
|---|---|---|
| JP | 10-190963 | 7/1998 |
| JP | 2000-103112 | 4/2000 |
| JP | 2000-103112 A | 4/2000 |
| JP | 2000-238322 | 9/2000 |
| JP | 2000-238322 A | 9/2000 |
| JP | 2001-244067 | 9/2001 |

* cited by examiner (A)

(B)

LIGHT SOURCE FOR IMAGE WRITING APPARATUS AND PRODUCTION METHOD FOR LIGHT SOURCE

TECHNICAL FIELD

The present invention relates to a light source for an image writing apparatus and a production method of the light source.

BACKGROUND ART

Some color laser printers (called a printer hereinafter) 100 employ a printing method called a tandem method that enables the printer to print in parallel a visible image consisting of four colors, Y (yellow), M (magenta), C (cyan) and B (black), as shown in FIG. 1, so that the printer can perform high-speed printing. In order to form a four-colored visible image in parallel, the printer 100 employing the tandem method is provided with four sets of writing systems 110, with each system including an electric discharger 105, a photosensitive drum 106, an electric charger 107, a light source 200, and a developing device 108, as shown in FIG. 2.

A recording paper 120 on a tray 101 as shown in FIG. 1 is fed in a traveling route 103 inside the printer 100 by a carrying roller 102. While the carrying roller 102 is carrying the recording paper 120, writing light emitted from the light source 200 forms a latent image on each photosensitive drum 106 per color, and then the developing device 108 forms a visible image.

The visible image formed on each photosensitive drum 106 is transcribed on the recording paper 120 in the traveling route 103, and then a fixing device 109 fixes the visible image thereon. After that, the recording paper 120 is outputted from the printer 100.

The light source 200 is provided with a substrate 601 extended in a main scanning direction on which light emitting elements 8 consisting of a number of LEDs (Light emitting Diode) are formed, as shown in FIG. 3. Each light emitting element 8 emits a ray of light A in a direction perpendicular to the substrate 601. As shown in FIG. 3, the ray A passes through light transmitting structure 310 such as a rod lens or a fiber lens, which composes the light source 200, and forms the latent image on the photosensitive drum 106.

The light transmitting structure 310 has a narrow angular aperture and a depth of focus is maintained to be long so that a clear latent image may be formed on the photosensitive drum in a simple manner.

SUMMARY OF THE INVENTION

In order to emit light A toward the photosensitive drum 106, the substrate 601 is configured, as shown in a short side of substrate 601, as parallel with a sub-scanning direction (a direction perpendicular to an axis of the photosensitive drum 106), and a surface of the substrate 601 on which light emitting elements 8 are formed faces the photosensitive drum 106.

It is said that each light emitting element 8 must be of a specific size in order that the light source 200 outputs luminous intensity sufficient to form a latent image. And, the substrate 601 must be provided with accessories such as a driver to emit light from the light emitting element 8. Therefore, the short side of the substrate 601 should be a predetermined length.

Under the above-mentioned configuration, that is, when the short side of the substrate 601 is parallel with the sub-scanning direction and the surface provided with the light emitting elements 8 faces the photosensitive drum 106, if the short side of the substrate is long, the sub-scanning direction of the writing system 110 per color becomes long.

In a tandem type of printer 100, four colors writing systems 110 are disposed in series in the sub-scanning direction. Even if a length of the writing system 110 becomes a little longer in the sub-scanning direction, the printer 100 becomes large.

Recently, a laser printer has been required to print an image with high resolution. In order to print an image with high resolution, the printer must increase resolution in the sub-scanning direction. This increases a number of scanning per length unit in the sub-scanning direction, with a result that a printing time increases. To print an image with high resolution in a short time, exposure time per sub-scanning line should be shortened. But in such case, it is not possible to obtain sufficient exposure to form a latent image on the photosensitive drum 106.

Additionally, in order to print an image with high resolution by an electro photographic type of printer 100, a number of light emitting elements must be disposed in a sub-scanning direction with narrowing of each space. In order to dispose a number of the light emitting elements while narrowing each space, a size of the light emitting element 8 must be small. If the size of the light emitting element 8 was small, brightness of each light emitting element decreased, which reduces luminous intensity on the photosensitive drum 106.

A method, which increases exposure on the photosensitive drum 106 without slowing down printing speed, and instead of changing the size of the light emitting element 8, is to improve light transmission efficiency by enlarging an angle aperture of a lens composing the light transmitting structure 310. However, when the angle aperture was enlarged, a focal depth was shortened. Accordingly, it is hard to form a clear latent image on the photosensitive drum 106. And, another method is to increase brightness of the light emitting element 8 by applying much electric field thereon. But, applying much electric field on the light emitting element 8 not only reduces luminescence life of the light emitting element 8 but also increases power consumption.

The present invention has an object to provide a light source for an image writing apparatus, wherein the light source forms a latent image with high resolution without preventing downsizing of a printer and has a long luminescence life, and another object to provide a production method thereof.

The present invention suggests a light source for image writing apparatus that can radiate light in a normal direction to a photosensitive drum, regardless of a direction of a substrate provided with light emitting elements, by converting an advancing direction of light emitted from a light emitting element.

The light source of image writing apparatus of the invention is provided with converting structure for converting the advancing direction of light. The converting structure may be a prism or a light guide for converting the advancing direction of light by reflecting the light therein once or plural times.

In a conventional configuration, which is not provided with the converting structure, a short side of the substrate should be parallel with a sub-scanning direction, and a light emitting surface should face the photosensitive drum, in order that light irradiates the photosensitive drum. But the light source of the invention, which is provided with the converting structure, can eliminate necessity of such configuration. In other words, the light source of the invention is configured that, when a height of the substrate (a length from the light emitting surface to an upper end of a sealing glass) is less than the short side of the substrate, a height direction of the substrate is parallel with the sub-scanning direction, and a surface formed by a longitudinal direction and height direction of the substrate faces the photosensitive drum. According to such configuration, it is possible to provide a light source having a short sub-scanning direction, and downsize the light source.

Additionally, in the invention, the light source of the image writing means is provided with directivity structure for imparting directivity to light emitted from a light emitting element and guiding the light to light transmitting structure. According to this configuration, it is possible to improve efficiency of light transmission while maintaining an angle aperture small. The light transmitting structure may be a fiber lens that is formed by a plurality of single lenses. Additionally, one of single lenses may correspond to one of light emitting elements so as to pass light emitted from the light emitting element through this single lens.

According to the above-mentioned configuration, light from the light emitting element is guided to the light transmitting structure efficiently, and it is possible to eliminate necessity of using a light transmitting structure having a large angle aperture.

Condensing structure is provided between the light emitting element and the photosensitive drum, whereby light is transmitted to the photosensitive drum through the condensing structure. When the light, even if the light has a large light emitting area, irradiates the photosensitive drum, a sectional area becomes small. Therefore, a light emitting element with a large light emitting area can form a latent image with small pixels on the photosensitive drum.

When an electronic photographic type of printer prints an image with high resolution, a number of light emitting elements must be disposed within a specific section in the main scanning direction. Accordingly, the light emitting element has a limitation in a length of the main scanning direction. But, a length of the sub-scanning direction is not limited in particular. In a case of condensing light emitted from the light emitting element extended in the sub-scanning direction by the condensing structure, a high luminous flux density can be increased. Therefore, after the condensing structure condenses light emitted from the light emitting elements extended in the sub-scanning direction, the light irradiates the photosensitive drum, so that sufficient exposure to form a latent image can be obtained.

Therefore, it is not necessary to enlarge an angle aperture of the light transmitting structure in order to obtain sufficient exposure to form a latent image as above. And, while maintaining a deep focal depth, sufficient exposure to form a latent image can be obtained.

When a flat luminous type of light emitting element is formed directly on the light transmitting structure, light emitted from the light emitting element is transmitted directly to the light transmitting structure without passing through a low refractive index layer with low directivity. And most of rays of light reach the photosensitive drum without leakage, with a result that the light can reach the photosensitive drum while maintaining sufficient luminous intensity. Accordingly, since it is not necessary to apply a high electric field on the light emitting element to increase brightness, it is possible to form a latent image with high resolution without reducing luminescence life. And, since the angle aperture of the light transmitting structure is not required to be large to form the latent image, a focal depth can be maintained deep.

In addition, the light source may be configured such that one of the light emitting elements corresponds to a plurality of single lenses. Under such configuration, a width of each single lens is smaller than a diameter of a corresponding light emitting element, so that the light emitting element can be formed with disregard to a positional relationship between the light emitting element and the single lens. This makes production easy.

Moreover, the light source of image writing apparatus may be configured to be provided with directivity structure between the light emitting element and the light transmitting structure, and to form the light transmitting structure, the directivity structure, and the light emitting element in a unit optically. The directivity structure, optically formed with the light transmitting structure and the light emitting element, has a mesa structure, and the light emitting element is disposed on an upper surface of the mesa structure. According to such configuration, transmission efficiency can be improved.

Additionally, the directivity structure may be a light guide for imparting directivity to a ray of light by reflecting light therein once or plural times.

The light source, of which a flat luminous type of the light emitting element is formed directly on the light transmitting structure, can be produced according to the following manner. A transparent electrode element is formed on the light transmitting structure directly, and a light emitting layer element including a flat luminous unit is formed on the transparent electrode element, and then a metal electrode layer is formed on the light emitting element.

Otherwise, when the directivity structure is formed with the light transmitting structure and the light emitting element as a single piece, the directivity structure is formed on the light transmitting structure directly, the transparent electrode element is formed on the directivity structure, the transparent electrode element is formed on the directivity structure, the light emitting element consisting of the flat luminous unit is formed on the transparent electrode element, and then the metal electrode element is formed on the light emitting element.

DETAILED DESCRIPTION OF THE PREFERRED EMBODIMENTS

Embodiment 1

Figure 1:
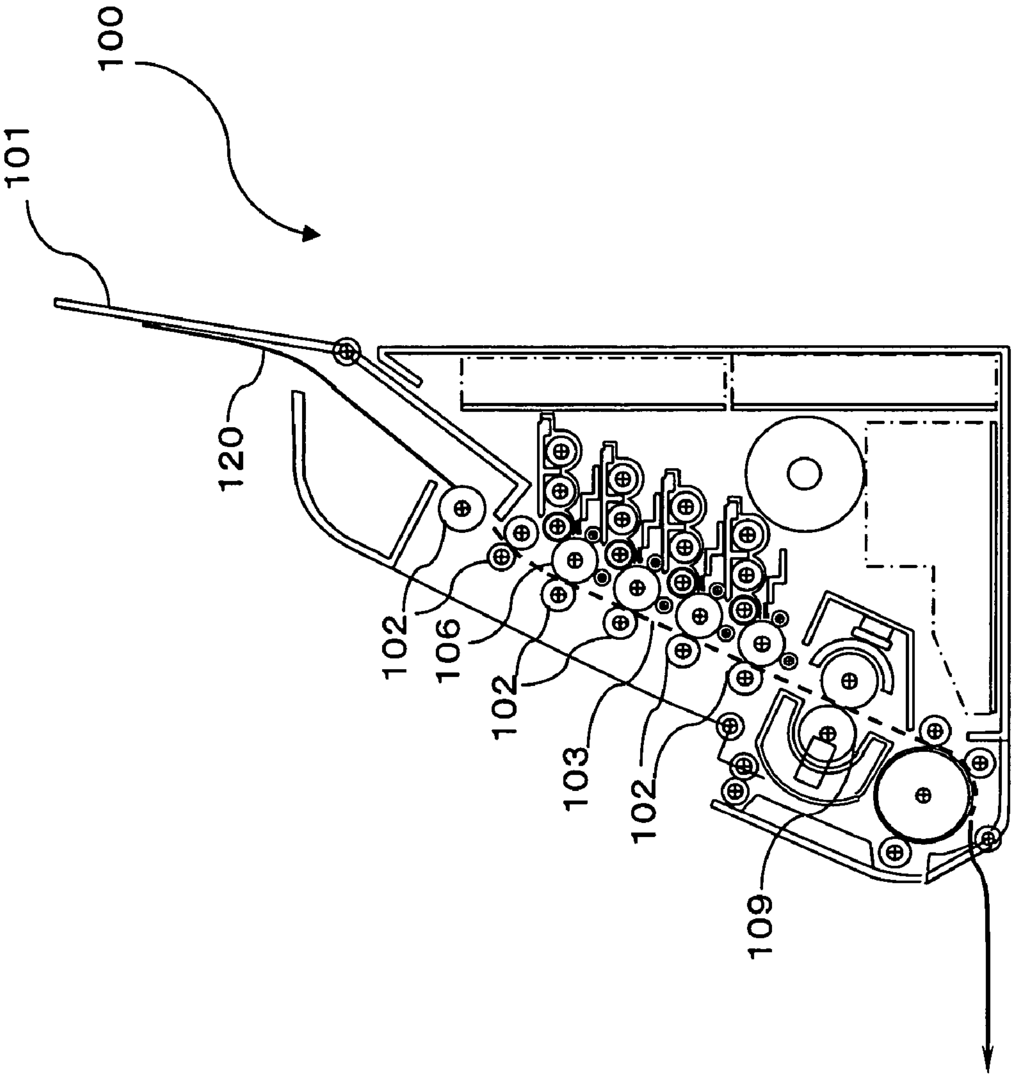
FIG. 1 is an outline view of a printer.

A light source 200 for image writing apparatus in the invention is applied as a light source to a color laser printer (which is called a printer hereinafter) 100 shown in FIG. 1, like a conventional way.

Figure 4:
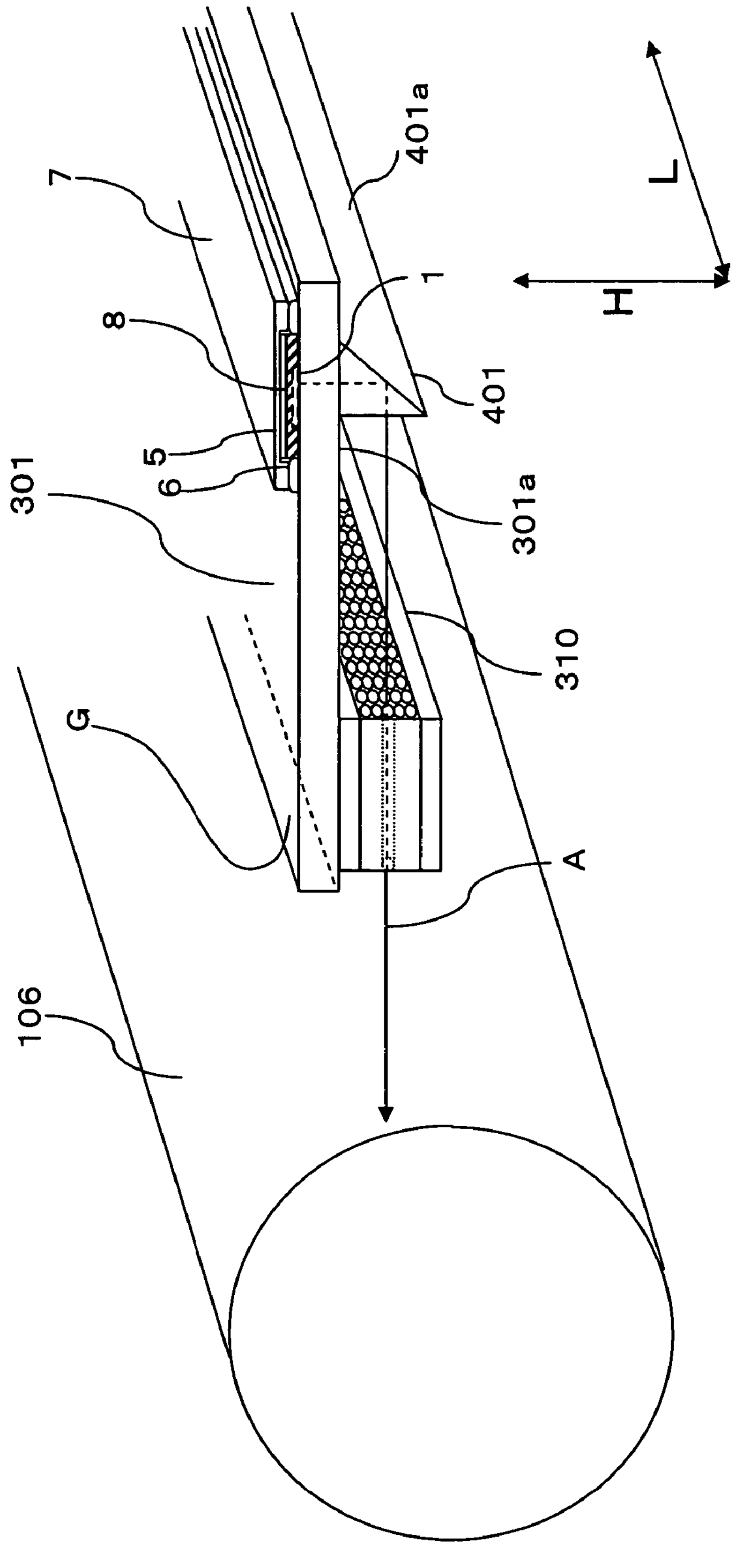
FIG. 4 is a sectional view of a light source using a prism as converting structure, and a photosensitive drum.

The light source 200 in this embodiment is composed of a transparent substrate 301 and light transmitting structure 310 that are extended in a main scanning direction as shown in FIG. 4. On one surface of the transparent substrate 301, a row composed of a plurality of light emitting elements 8 is formed in a long side direction of the transparent substrate 301 by performance of a following method.

Figure 5:
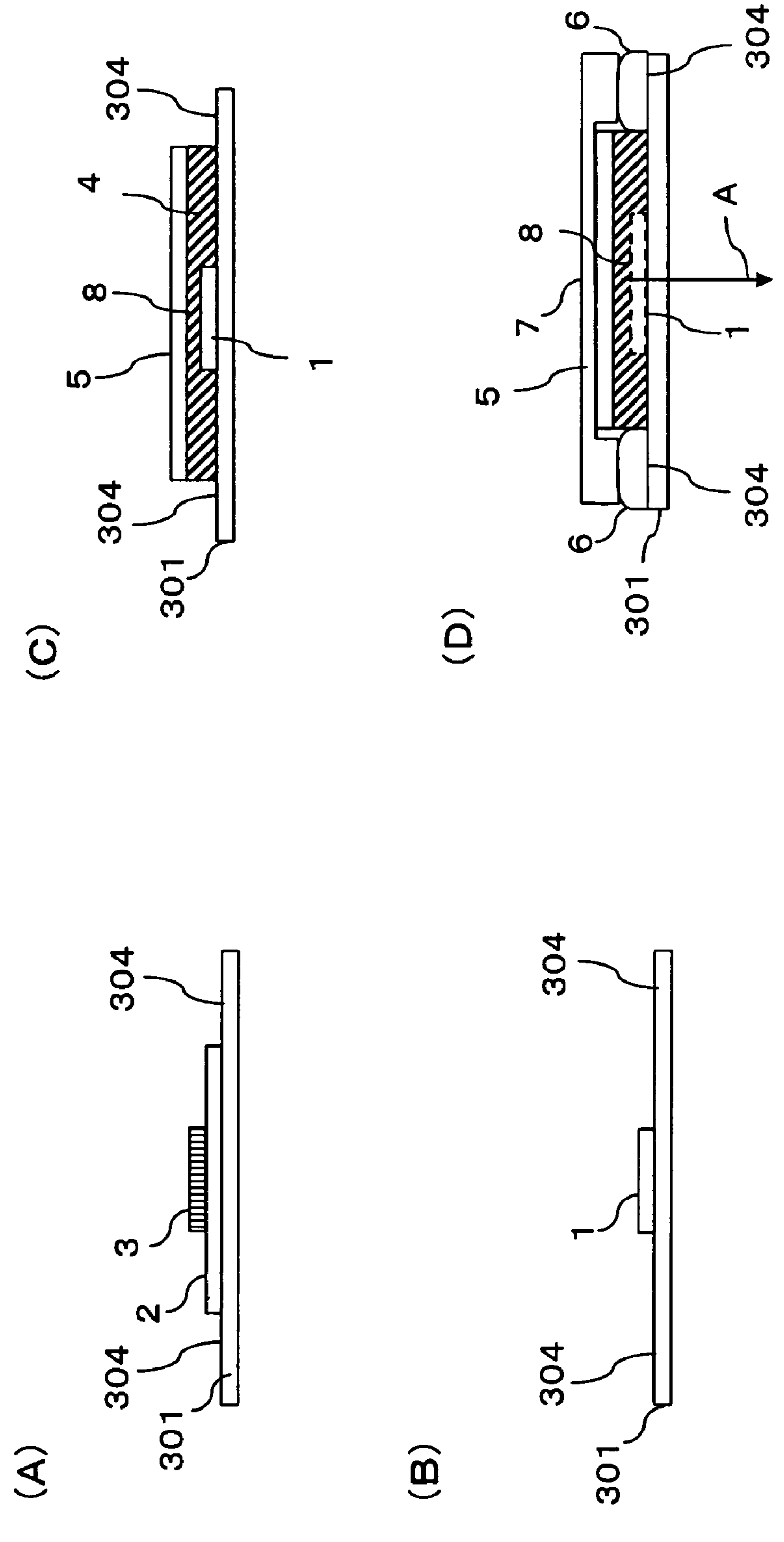
FIG. 5 shows steps (A) to (D) for producing the light emitting element.

First, a transparent electrode layer 2 like ITO (Indium Tin Oxide) is applied on an entire surface of the transparent substrate 301, as shown in FIG. 5(A), and a shading film 3 masks a section of the transparent electrode layer 2, with this section being one on which a transparent electrode element 1 is to be formed as an anode. The transparent electrode layer 2 is subjected to photolithography, such as exposure, development, and etching. After the photolithography, other sections without masking are removed from the transparent substrate 301, as shown in FIG. 5(B), and each masked section becomes the transparent electrode element 1. A plurality of sections on the transparent substrate 301 are masked at fixed intervals in a longitudinal direction, and thereby a row of transparent electrode elements 1 is formed in the longitudinal direction.

In a next step, an organic EL (Electro Luminescence) material is applied over the surface of the transparent substrate 301, including the transparent electrode elements 1, as shown in FIG. 5(C), which forms an organic EL layer 4. On a surface of the organic EL layer 4, metal to be a metal electrode layer 5 is applied as a common electrode. The organic EL layer 4, which is sandwiched between the metal electrode layer 5 and the transparent electrode element 1, becomes a light emitting element 8.

Additionally, in order to protect the organic EL layer 4 from physical impact or moisture, the organic EL layer 4 is subjected to sealing. As shown in FIG. 5(D), the sealing is processing in which an adhesive resin 6, like epoxy resins including a glass filler, is applied on a sealing section 304 and the metal electrode layer 5 and the resin 6 are sealed by sealing glass 7. The light emitting element 8 thus formed emits a ray of light A in a direction perpendicular to the transparent substrate 301, and ray A passes through the transparent electrode element 1 and is discharged from the transparent substrate 301, as shown in FIG. 5(D).

The transparent substrate 301 is disposed so that surface G formed by long side direction L and height direction H of the transparent substrate 301 faces a photosensitive drum 106, as shown in FIG. 4.

And an orthogonal prism 401 extended in the main scanning direction is disposed on a surface (which is called a light emitting surface 301*a* hereinafter) opposite to the surface on which the light emitting elements are formed, and this disposed position corresponds to the row of the light emitting elements. Accordingly, the ray A emitted from the light emitting element 8 passes through both the transparent electrode element 1 and the transparent substrate 301, and comes into the prism 401 from the light emitting surface 301*a*.

As shown in FIG. 4, one surface making a right angle of the orthogonal prism is disposed on the transparent substrate 301. The ray A incident from the surface changes direction by a slanting surface 401*a* and is discharged from another surface making the right angle of the orthogonal prism. Accordingly, an advancing direction of the ray A converts to a direction parallel to the transparent substrate 301 (a normal direction of the photosensitive drum 106).

The light transmitting structure 310 is disposed between the prism 401 and the photosensitive drum 106, so as to form a latent image on the photo sensitive drum 106 by the ray A emitted from the prism 401. In this embodiment, the light transmitting structure 310 is supported by the transparent substrate 301.

The light transmitting structure 310 is provided with a lens alley binding a plurality of optical lenses like fiber lenses 313, rod lenses, or micro lenses. An optical lens used for the lens alley may be an image transmitting type or a type of transmission for light intensity.

Figures 6A, 6B, 6C:
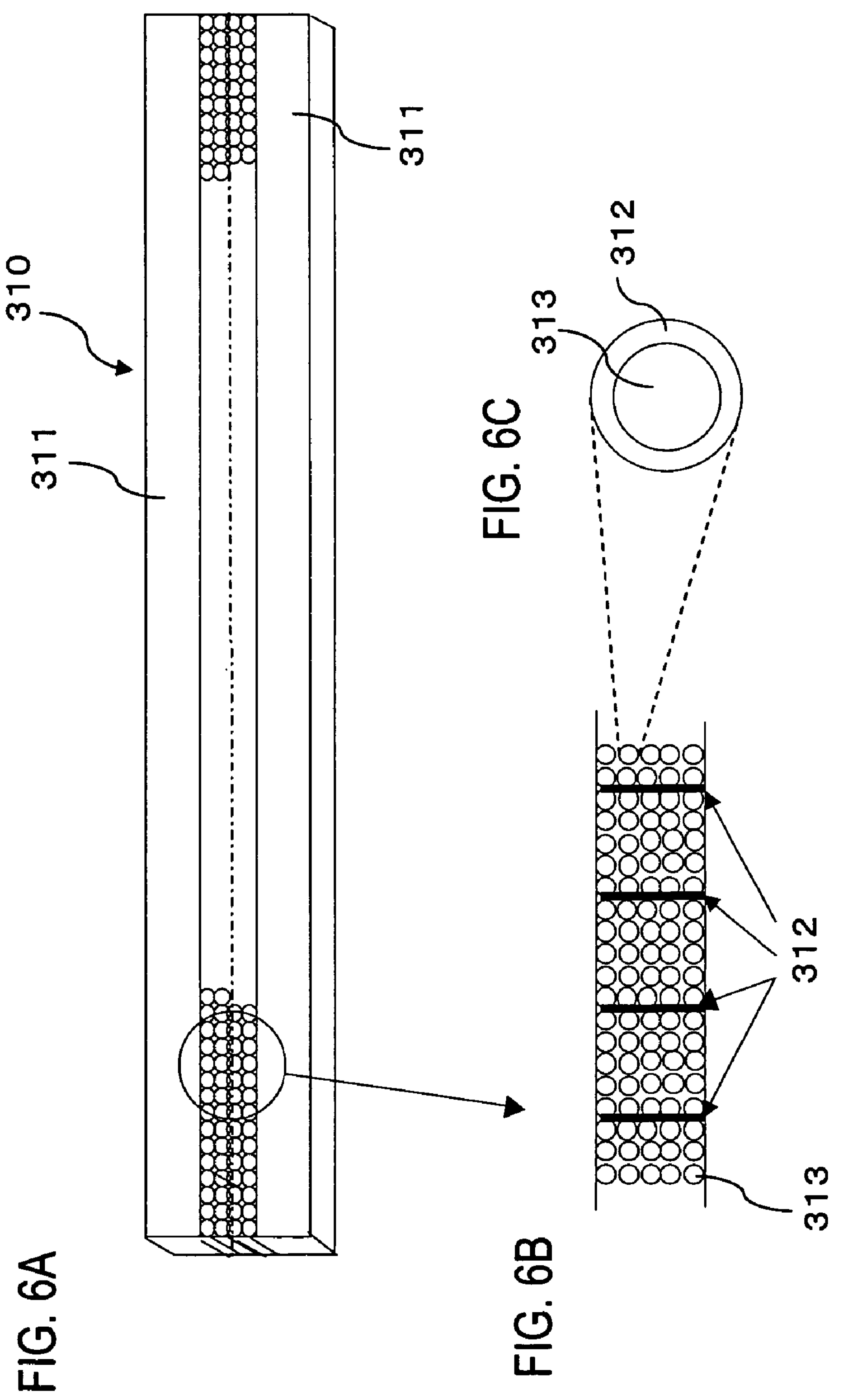
FIG. 6A is an external view of the light transmitting means.
FIG. 6B is an enlarged view of FIG. 6A.
FIG. 6C is an enlarged view of FIG. 6B.

As shown in FIGS. 6A and 6B, a fiber lens alley is disposed within a space surrounded by two base frames 311 and a light absorbing layer 312 so that each axis of fiber lenses may face in a normal direction of the light sensitive drum 106. Gaps in a space in which fiber lens alleys are disposed are filled with an opaque resin.

The light absorbing layer 312 prevents crosstalk between the fiber lenses 313. To prevent the crosstalk, instead of providing the light absorbing layer between the two base frames 311, the opaque resin to be the light absorbing layer 312 may be applied on a circumferential surface of each fiber lens 313. In addition, the crosstalk can be prevented by using both the light absorbing layer 312 provided between the base frames 311 and the light absorbing layer 312 applied on the circumferential surface of the fiber lens 313.

The ray A of which the advancing direction is converted by the prism 401 passes through the light transmitting structure 310 and illuminates the photosensitive drum 106, with a result that a latent image is formed.

As described above, the light source 200 is provided with the prism 401 as a converting structure for changing the advancing direction of the ray A, and thereby the ray A emitted from the light emitting element 8 can illuminate the photosensitive drum 106 without facing the light emitting surface 301*a* of the transparent substrate 301, like a conventional way.

Figure 7B:
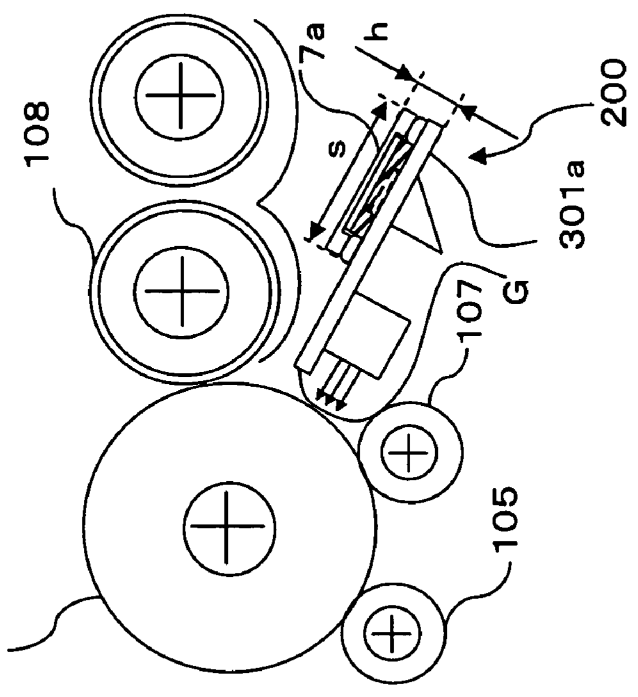
FIG. 7B is another outline view of the light source and the photosensitive drum of the other image writing apparatus.
Figure 7A:
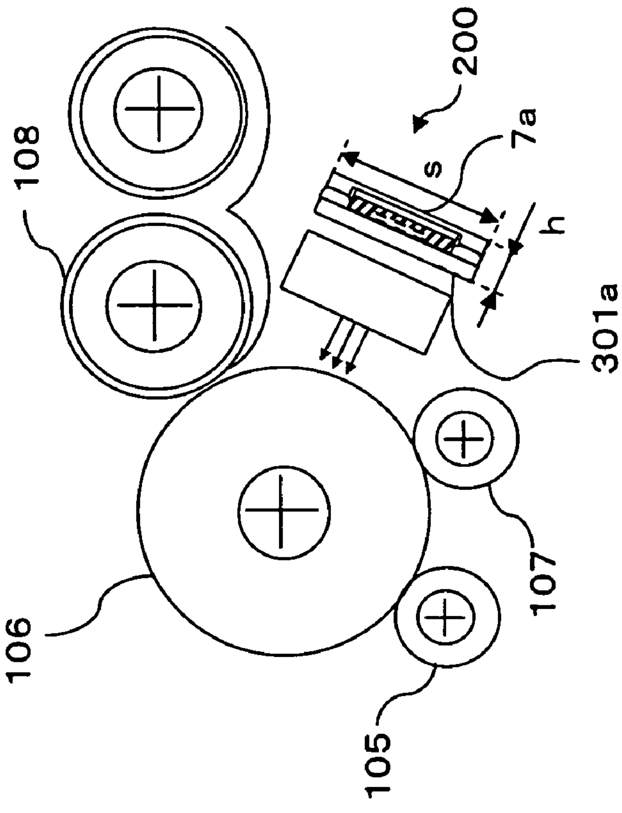
FIG. 7A is an outline view of the light source and the photosensitive drum of the image writing apparatus.

FIG. 7A shows a sectional view of a writing system 110, wherein a height h between the light emitting surface 301*a* and a top of sealing glass 7*a* is shorter than a shorter side s of the transparent substrate 301, and the shorter side s of the transparent substrate 301 is disposed so as to be parallel with a sub-scanning direction while the light emitting surface 301*a* of the transparent substrate 301 is disposed so as to face to the photosensitive drum 106 in the conventional way. And, FIG. 7(B) shows a sectional view of writing system 110, wherein surface G formed by both long side direction L and height direction H of transparent substrate 301 is disposed so as to face the photosensitive drum 106 as in FIG. 4. As shown in FIG. 7 (B), the sub-scanning direction of the light source 200 becomes shorter by disposing the surface G so as to face the photosensitive drum 106. Accordingly, it is possible to provide the writing system 110 with a shorter sub-scanning direction.

Figure 2:
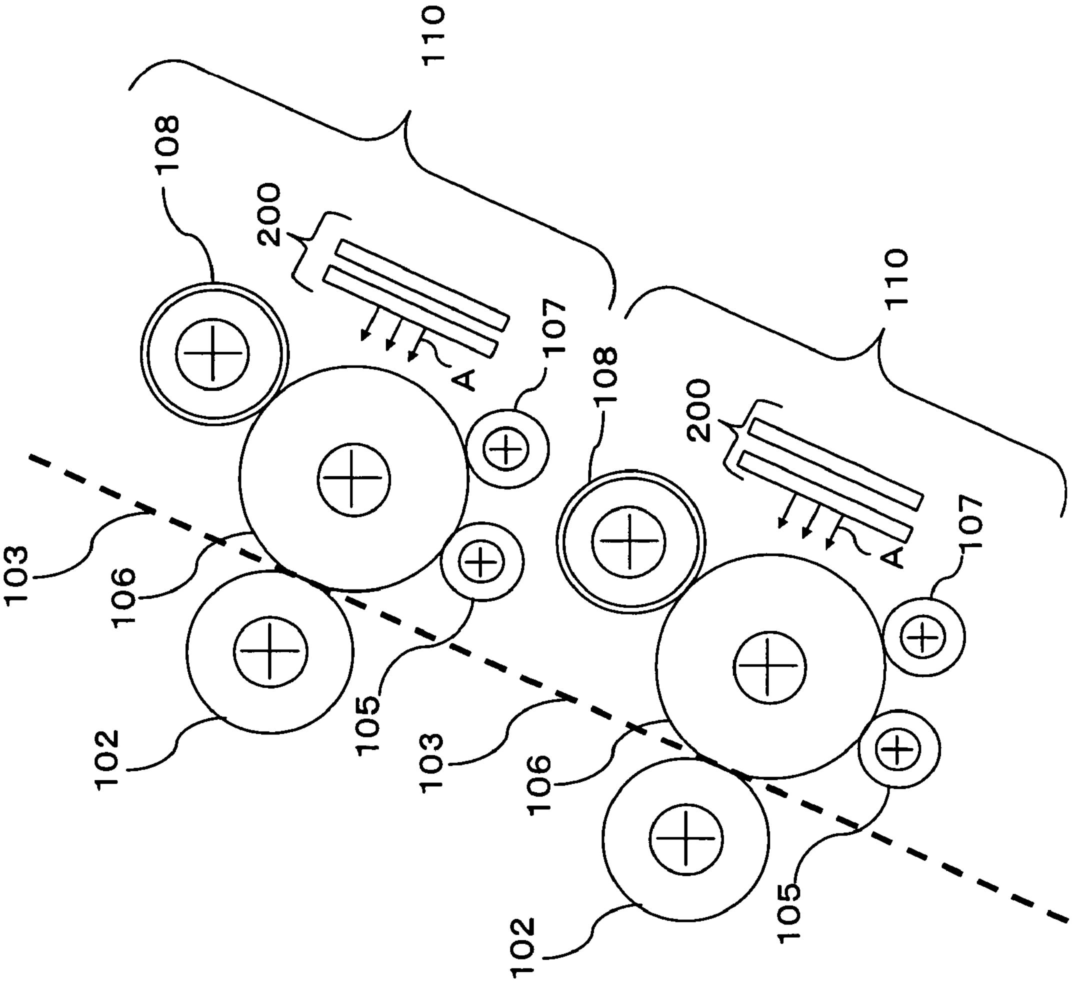
FIG. 2 is an enlarged view of a light source part.
Figure 3:
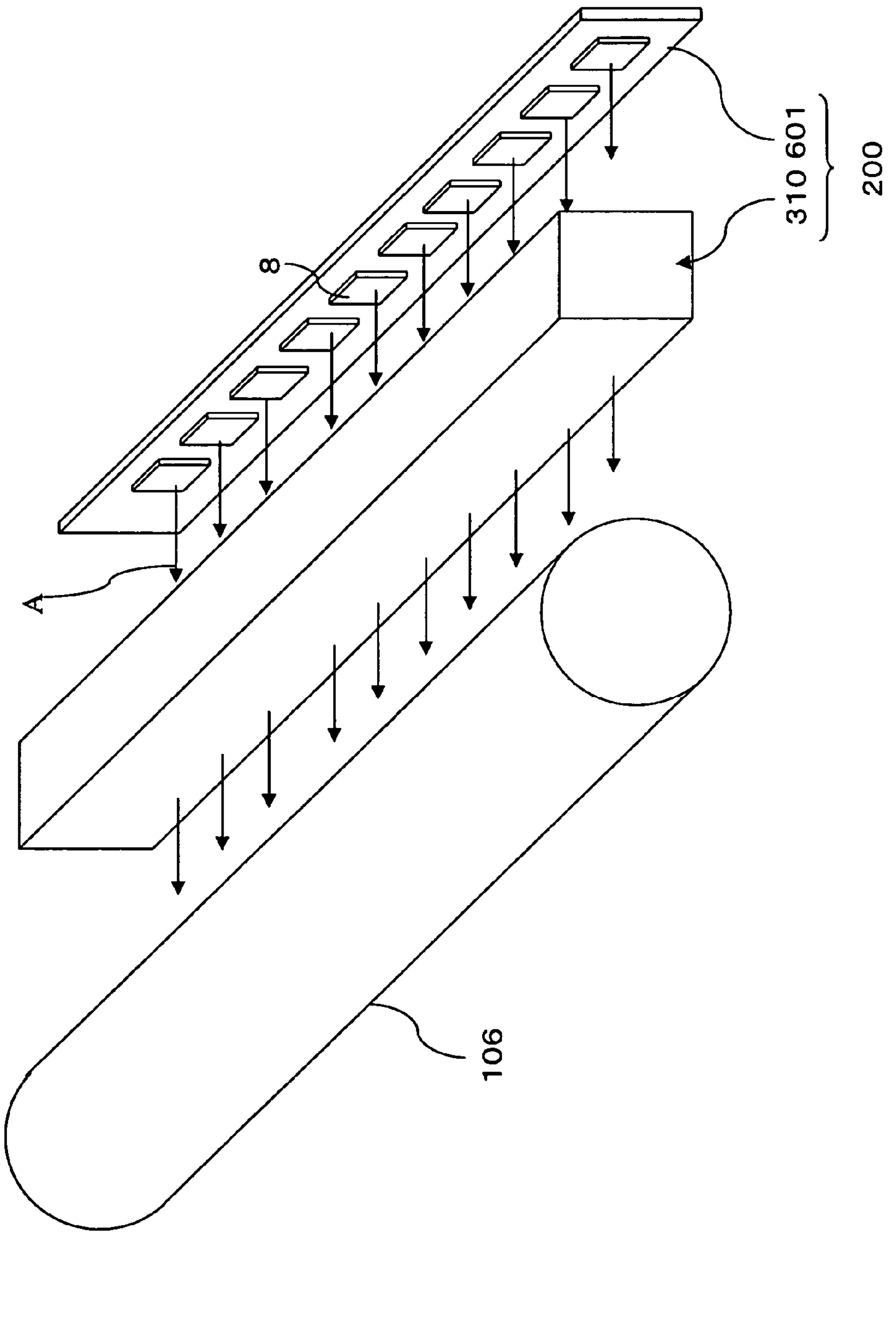
FIG. 3 is an outline view of a light source.

If the sub-scanning direction of the light source 200 gets shorter, the writing system 110 shown in FIG. 2 has a short sub-scanning direction, whereby a pitch of each photosensitive drum becomes narrow, so that a size of the printer 100 can be reduced.

In addition, the prism 401 as the converting structure in the above description converts the advancing direction of the ray A 90 degrees as shown in FIG. 4, but an angle to which the advancing direction is converted is changeable freely by adjusting an angle of the slanting surface 401*a*.

Therefore, a layout of assemblies inside the printer 100 can be designed according to downsizing of the printer and facilities of printer production rather than the advancing direction of the ray A. Additionally, the above embodiment is explained based on that the prism 401 is used as the converting structure; however, the converting structure may be a unit to convert the advancing direction of the ray A emitted from the light emitting element 8, and a shape or material of the converting structure is not limited in particular.

Embodiment 2

Figure 8A:
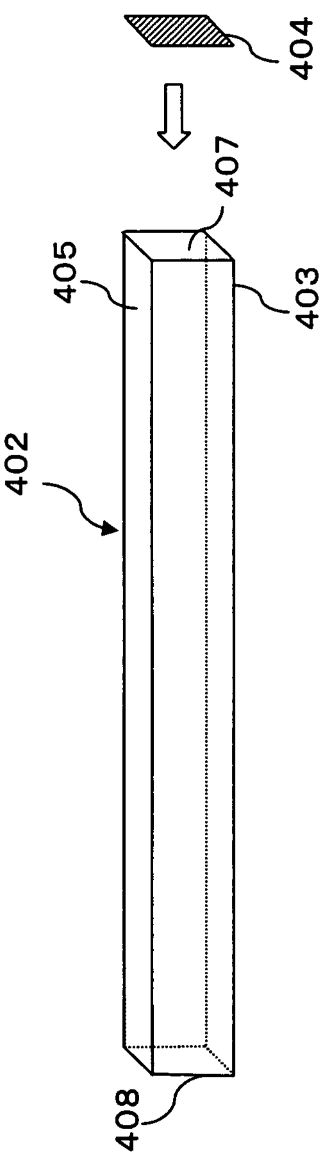
FIGS. 8A to 8C are diagrams showing light guides having different shapes respectively.
Figure 8B:
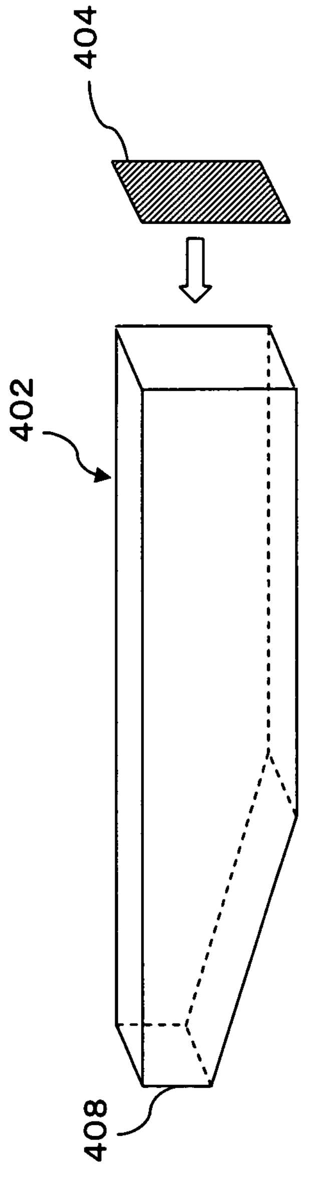
Figure 8C:
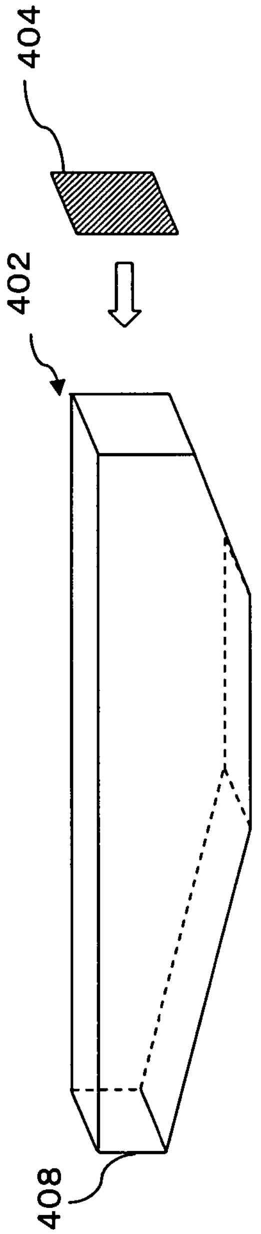

The converting structure, instead of the prism 401, may be a light guide 402 as shown in FIG. 8, and the light guide 402 is made of a transparent material with a higher refractive index than air and the transparent substrate 301. As shown in FIG. 8A, a reflection material 404 made of a material without transparency, such as a metal, is layered over a surface 407 opposite to an emitting surface 408 from which ray A incident to the light guide 402 is emitted. Each light guide 402 is disposed on light emitting surface 301*a* so as to contact an upper surface 405 at an opposite position relative to transparent electrode element 1, as shown in FIG. 9.

Figure 9:
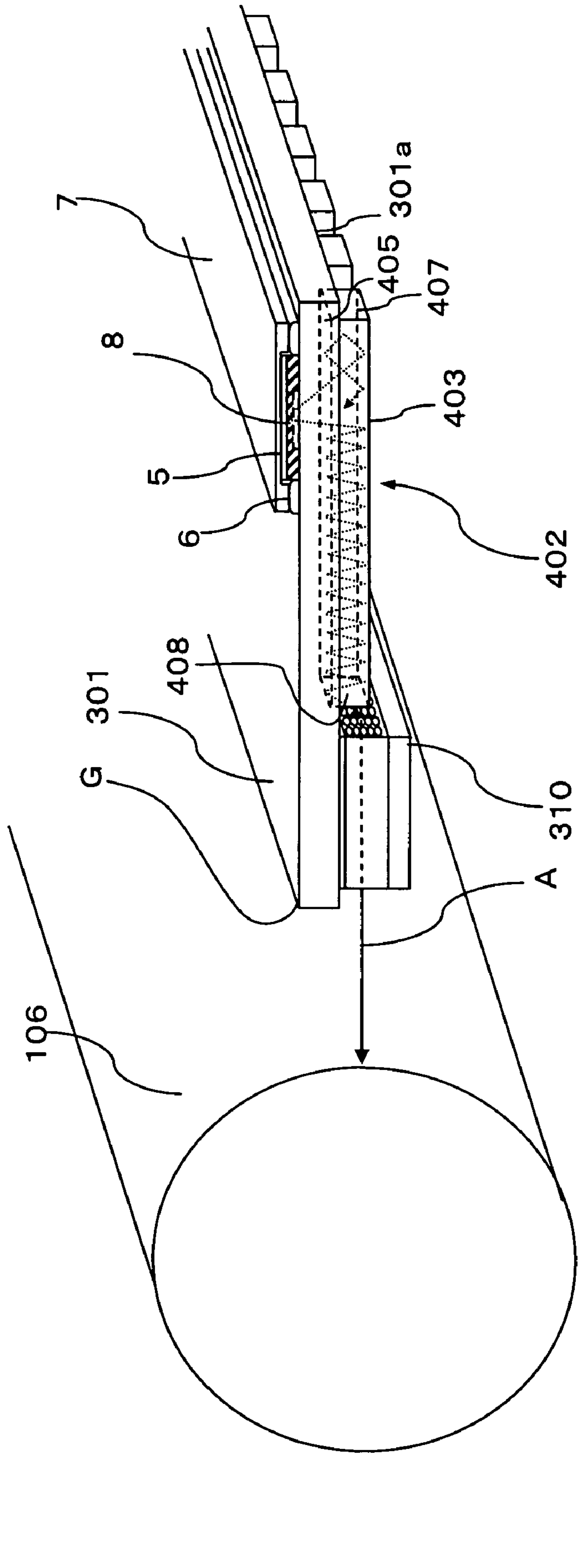
FIG. 9 is a sectional view of a light source using a light guide as converting structure, and a photosensitive drum.

As described in Embodiment 1, the light emitting element 8 emits the ray A downward (light guide 402 side) in FIG. 9. Accordingly, the ray of light emitted from the light emitting element 8 passes through the transparent electrode element 1 and the transparent substrate 301, and comes into the light guide 402 through the upper surface 405 of the light guide 402. Additionally, in order to reduce occurrence of crosstalk as much as possible when the ray A passes through the transparent substrate 301, the transparent substrate 301 should be thin.

As described above, the reflection material 404 is layered over the surface 407, and the refractive index of the light guide 402 is higher than that of air and the transparent substrate 301. Therefore, the ray A incident into the light guide 402 through the upper surface 405 repeats total reflection in the light guide 402, and then is emitted from the emitting surface 408.

As a result, an advancing direction of the ray A converts from a downward direction to a left side direction by passing through the light guide 402, that is to say, the direction is converted by 90 degrees.

Additionally, the ray A emitted from the emitting surface 408 of the light guide 402 passes through the light transmitting structure 310 and illuminates the photosensitive drum 106, whereby a latent image is formed, like Embodiment 1.

Figure 10:
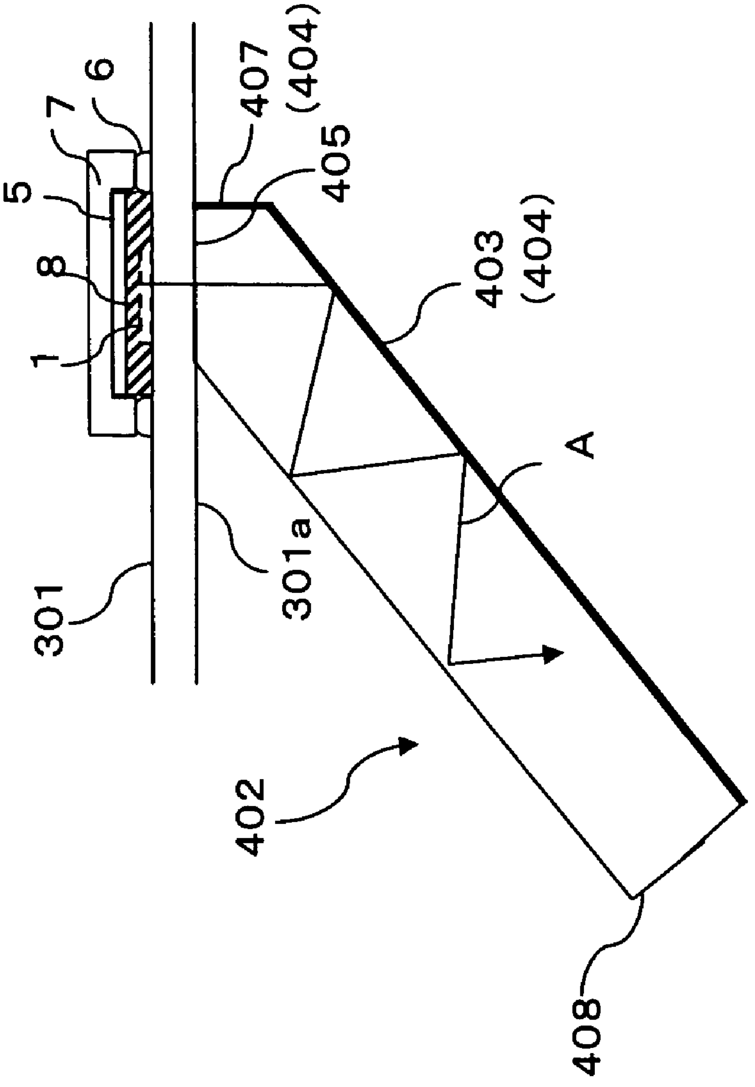
FIG. 10 is a sectional view of a light source using a light guide as converting structure.

In addition, the above explanation refers to a case that the advancing direction of the ray of light is converted by 90 degrees by using the light guide 402 as shown in FIG. 9. However, the advancing direction of the ray A is changeable freely by adjusting a longitudinal direction of the light guide 402 relative to any direction of the ray A to be emitted, as shown in FIG. 10.

Moreover, in such a case that the above-mentioned light guide is used as the converting structure, a sectional area of light emitted from the light emitting surface 408 has the same size as the light emitting surface 408 regardless of a size of a luminous area of the light emitting element 8. Accordingly, forming the light emitting element 8 with a large light emitting surface on the transparent substrate 301 can increase luminous flux density of light emitted from the emitting surface 408.

Therefore, the light source 200 has a short sub-scanning direction and outputs light with higher luminous flux density by using the light guide 402 as the converting structure. Additionally, a shape of the light guide 402 does not need to be a rectangular parallelepiped shown in FIG. 8A, but may be a pentagonal prism or a hexagonal prism shown in FIG. 8B or FIG. 8C.

Embodiment 3

Figure 11:
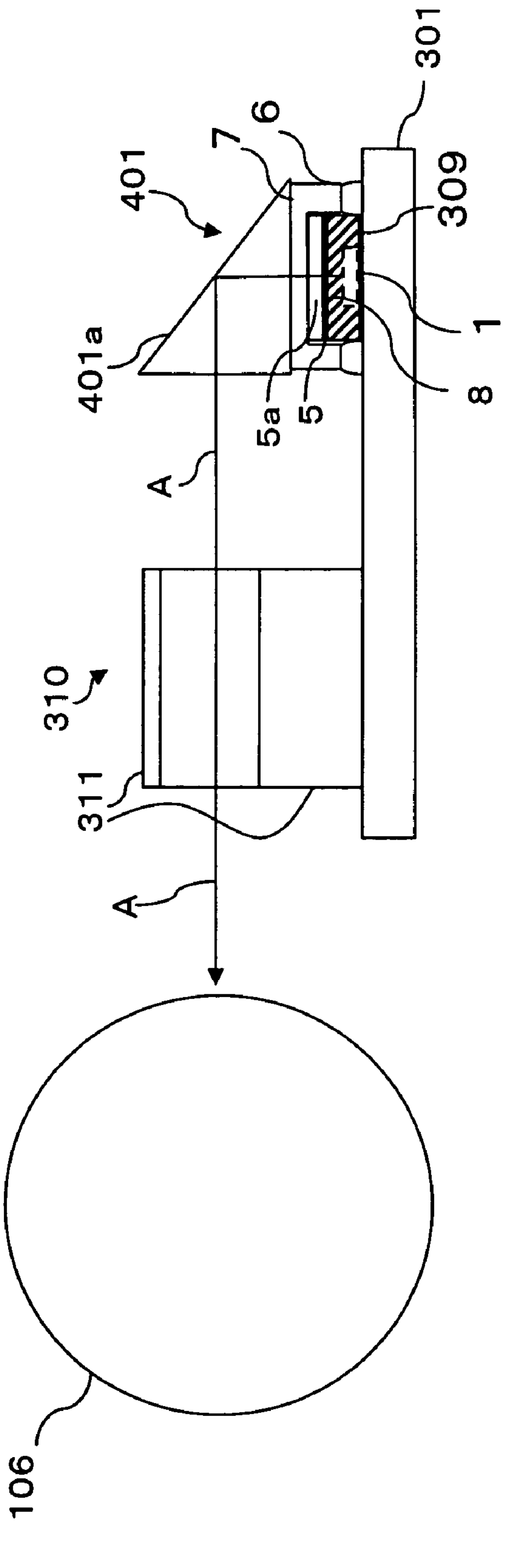
FIG. 11 is a sectional view of a light source using a prism as converting structure.
Figure 12:
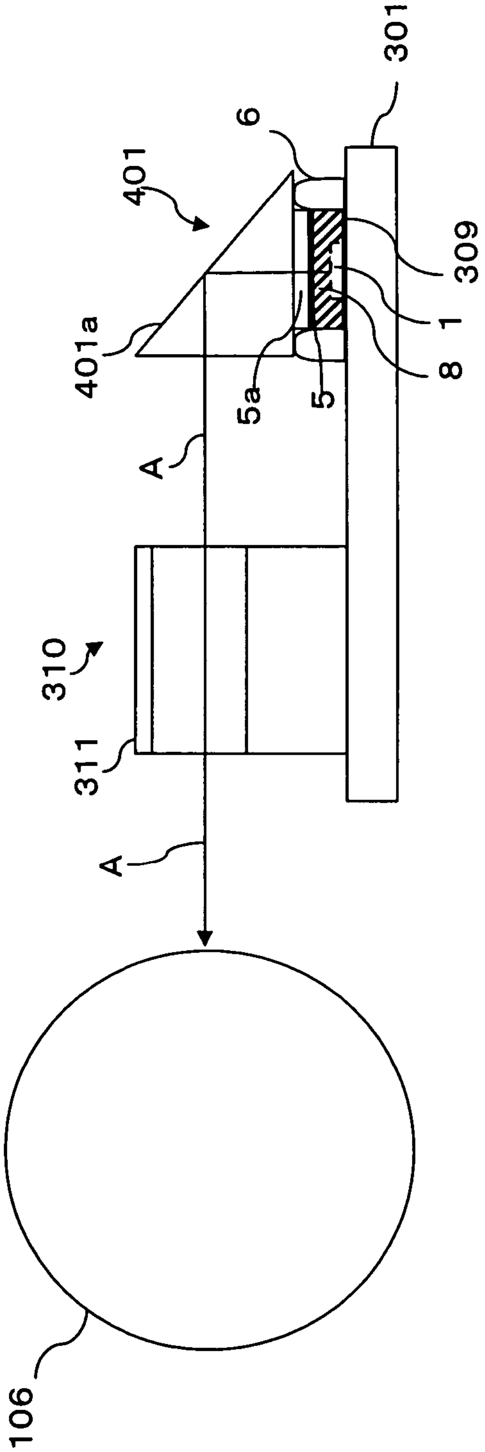
FIG. 12 is a sectional view of a light source using a prism as converting structure.
Figure 13:
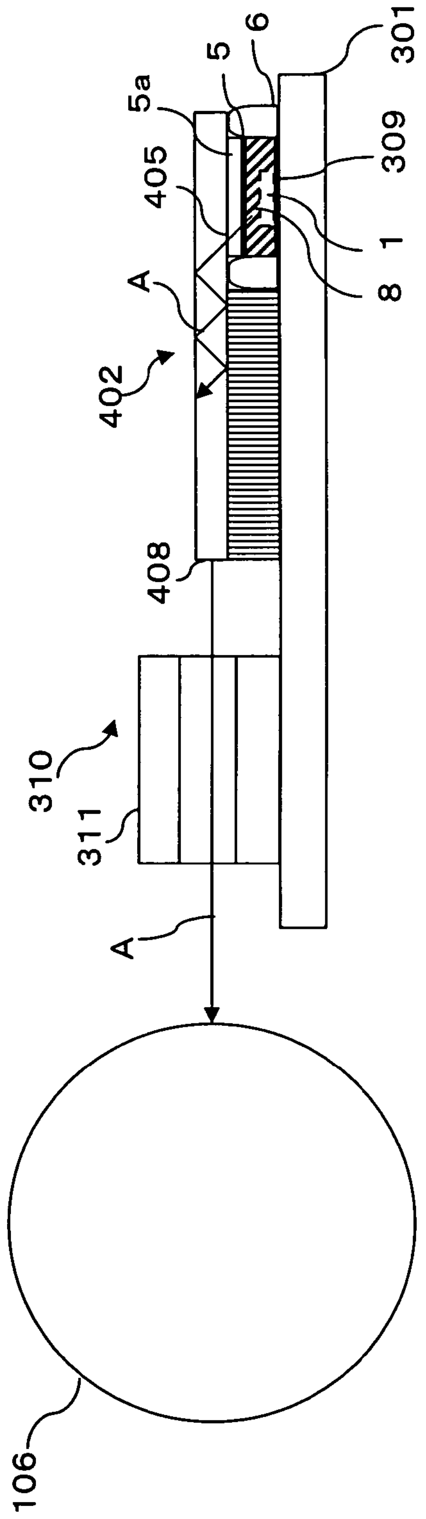
FIG. 13 is a sectional view of a light source using a light guide as converting structure, and a photosensitive drum.

Embodiments 1 and 2 explain a configuration of the prism 401 or the light guide 402 disposed on the light emitting surface 301*a* of the transparent substrate 301. Additionally, the prism 401 or the light guide 402 may be disposed on the same surface that the light emitting element 8 is formed, as shown in FIG. 11 to FIG. 13.

That is to say, prism 401 is disposed on sealing glass 7 so as to emit ray A emitted from the light emitting element 8 in an opposite direction to that described in Embodiments 1 and 2, and to lead the ray A into the prism 401 though the sealing glass 7.

However, when the light source 200 is formed as described in Embodiment 1, an opaque metal electrode layer 5 is formed on an upper side of the light emitting element 8 and the ray A cannot be emitted to the sealing glass 7. A cathode must use a material with a lower work function than the transparent electrode element 1 to be an anode in order to improve luminous efficiency of organic EL, whereby the opaque metal electrode layer 5 is applied to the cathode.

A thickness of the metal electrode layer 5 should be a specific value (approximate 100 Å) permeable to light so as to emit the ray A from a side of the sealing glass 7. And, in order that electric current flows uniformly over thin metal electrode layer 5, an electrode layer 5*a* made of a transparent material should be formed on the metal electrode layer 5.

According to such configuration, the ray A can be emitted in an upward direction in FIG. 11, and simultaneously, also be emitted in a downward direction. To prevent downward emission, a reflection plate 309 should be provided between the transparent substrate 301 and the transparent electrode element 1.

Additionally, like Embodiment 1, organic EL layer 4, the metal electrode layer 5 and the electrode layer 5*a* should be covered by resin 6 and the sealing glass 7 in order to protect the organic EL layer 4 from physical impact and moisture.

By reducing the thickness of the metal electrode layer 5, the ray A emitted from the light emitting element 8 is emitted from the sealing glass 7, and incident into the prism 401 provided on the sealing glass 7.

After the ray A incident into the prism 401 changes an advancing direction by being reflected on slanting surface 401*a*, the ray A is emitted from the prism 401, like Embodiment 1.

As described above, when the prism 401 and the light emitting element 8 are provided on the same surface of the transparent substrate, the light transmitting structure is also provided on the same surface on which the light emitting element 8 is formed. The prism 401 and the light transmitting structure 310 are disposed on the same surface on which the light emitting element 8 is formed in such way, and the transparent substrate 301 is not provided with anything on a surface opposite to the surface on which the light emitting surface element 8 is formed. This makes it easy to handle light source 200.

Additionally, instead of disposing the prism 401 on the sealing glass 7 as above, the prism 401 or the light guide 402 may be disposed on the electrode layer 5*a* and the resin 6 as shown in FIG. 12 and FIG. 13. In such case, the prism 401 or the light guide 402 performs a function of sealing glass.

Embodiment 4

Figure 14:
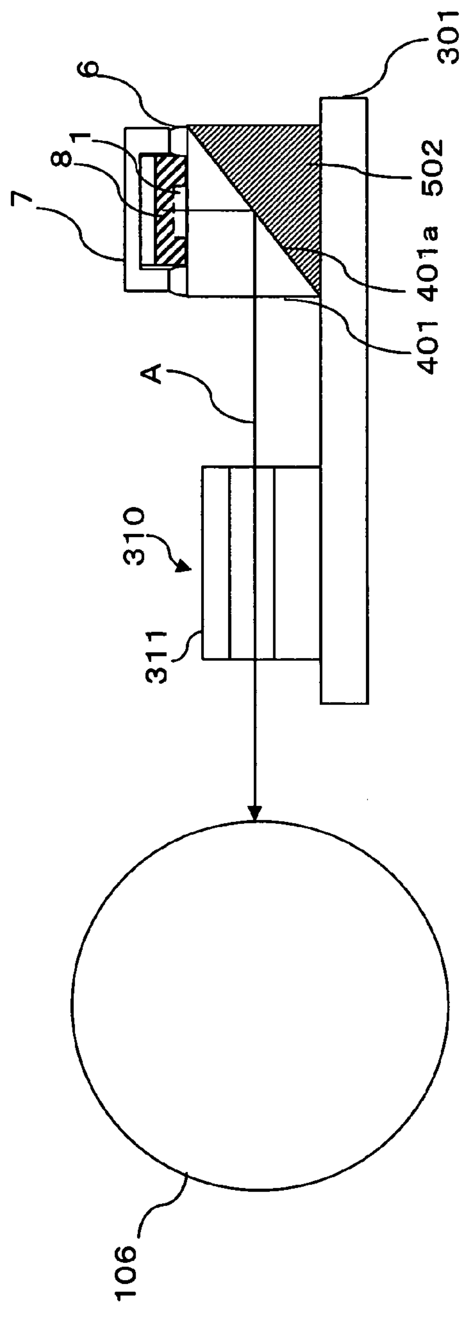
FIG. 14 is a sectional view of a light source using a prism as converting structure.
Figure 15:
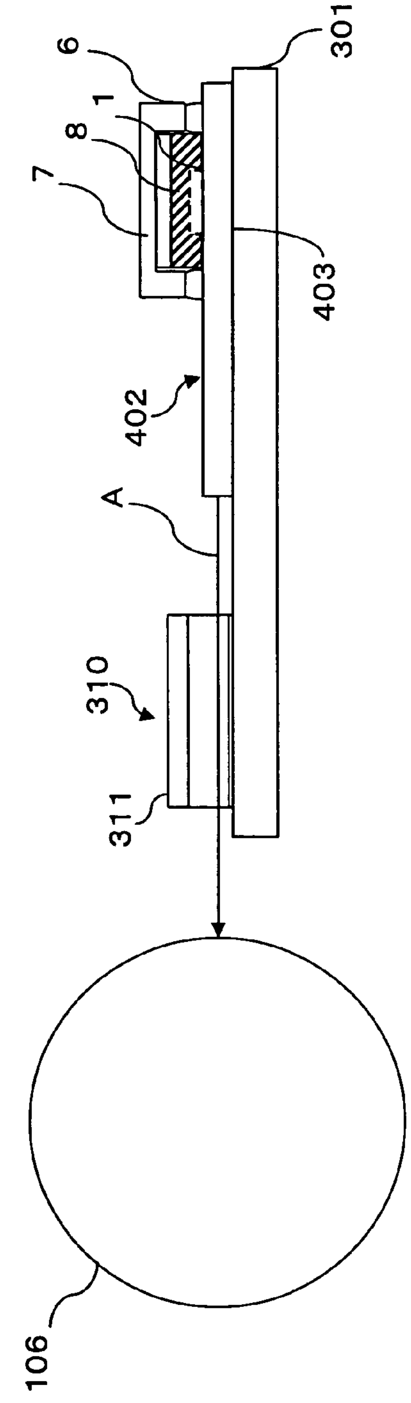
FIG. 15 is a sectional view of a light source using a light guide as converting structure.

Prism 401 or light guide 402 may be disposed between transparent substrate 301 and light emitting element 8, as shown in FIG. 14 and FIG. 15.

When the prism 401 is disposed on the transparent substrate 301 as shown in FIG. 14, a support stand 502 in the shape of a triangular prism, which is made of material with a lower refractive index than the prism 401, or of opaque material, should be disposed on the transparent substrate 301 to support the prism 401. And the prism 401 is placed on the support stand 502 so that slanting surface 401*a* of the prism may be contacted with a slanting side of the support stand 502.

By the same manner as in Embodiment 1 to form the light emitting element 8 on the transparent substrate 301, the light emitting element 8 is formed on the prism 401. And, light transmitting structure 310 is disposed on the same surface of the transparent substrate 301 that the prism 401 is disposed.

As shown in FIG. 14, after ray A emitted from the light emitting element 8 comes into the prism 401 through transparent electrode element 1, the ray A changes an advancing direction by being reflected from the slanting surface 401*a*. This reflected ray A forms a latent image on the photosensitive drum 106 through the light transmitting structure 310.

And, as shown in FIG. 15, the light guide 402 instead of the prism 401 may be disposed between the transparent substrate 301 and the light emitting element 8 so that a lower surface 403 of the light guide 402 may face the transparent substrate 301. In such case, reflection material 404 must be layered over a lower surface 403 of the light guide so as not to emit light from the lower surface 403.

The light guide 402 is provided with light emitting element 8 thereon in the same way of forming the prism 401 thereon. Ray A emitted from the light emitting element 8 is emitted from emitting surface 408 after repeating total reflection within the light guide 402 like Embodiment 2. This emitted ray A forms a latent image on the photosensitive drum 106 through the light transmitting structure 310.

As shown in FIG. 15, the ray A emitted from the light emitting element 8 is incident into the light guide 402 without passing through the transparent substrate 301. Therefore, there is a merit that crosstalk in the transparent substrate 301 will not occur in a writing system applying the configuration shown in FIG. 15, although crosstalk in the transparent substrate 301 occurs with the configuration shown in FIG. 9.

Embodiment 5

Figure 16:
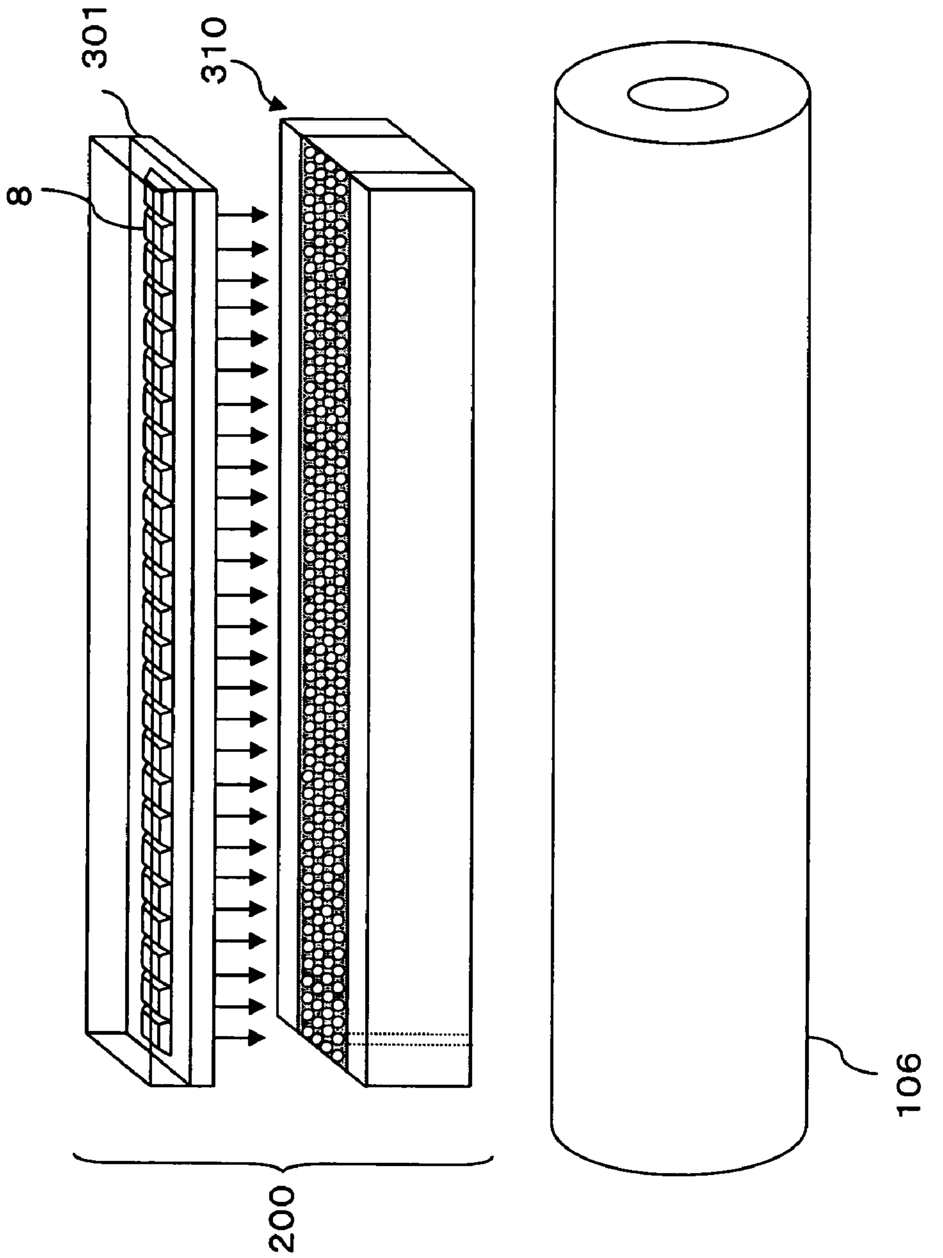
FIG. 16 is an outline view of a light source and a photosensitive drum of an image writing apparatus of the invention.

A light source in this embodiment is provided with transparent substrate 301 and light transmitting structure 310 extended in a main scanning direction as shown in FIG. 16. The transparent substrate 301 and the light transmitting structure 310 are supported respectively by a housing of printer 100, or either of the transparent substrate 301 or the light transmitting structure 310 is supported by the housing, and both the transparent substrate 301 and the light transmitting structure 310 are fixed to the printer 100 by being connected by a spacer or the like not illustrated in the drawings.

Figure 17:
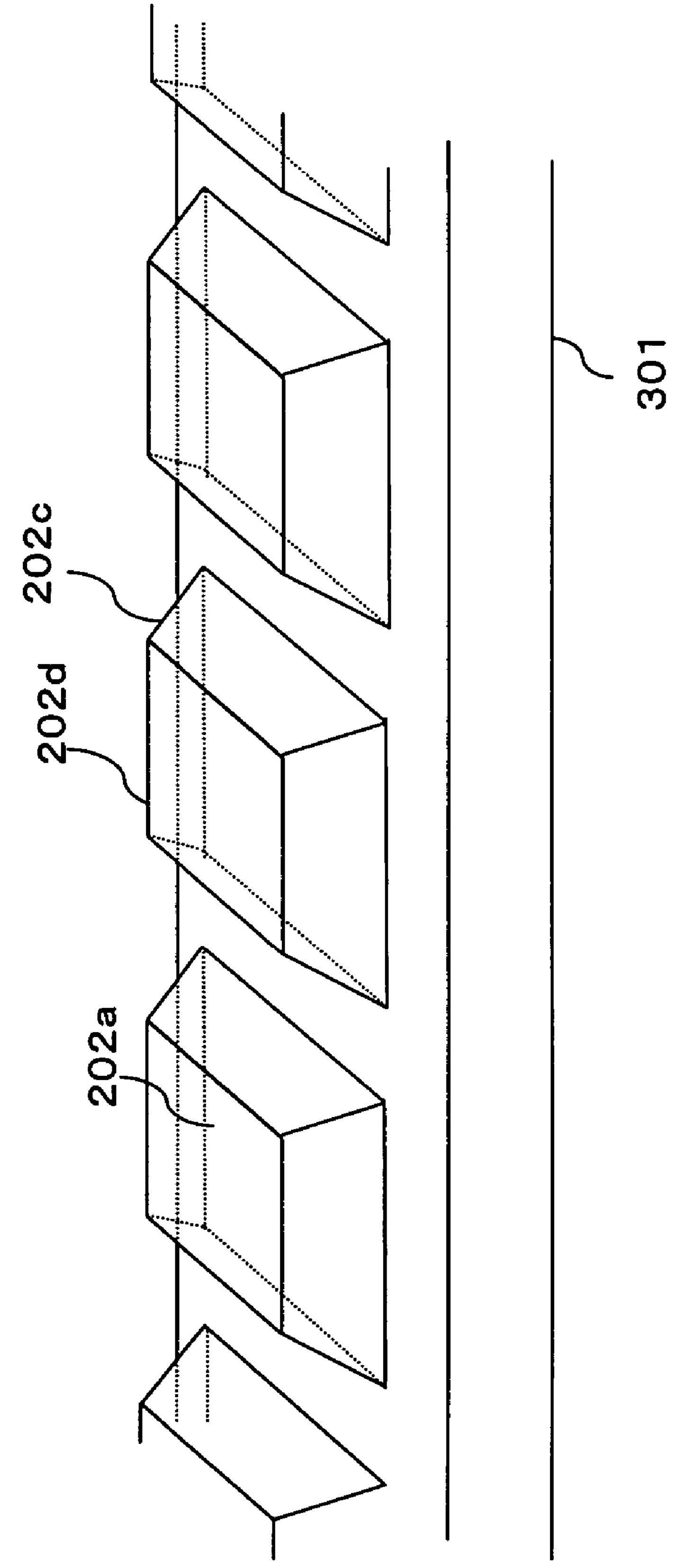
FIG. 17 is an outline view of a transparent substrate on which small projections are formed.

The transparent substrate 301 is provided with a number of small projections 202*d* with a mesa structure of a frustum as shown in FIG. 17 in the main scanning direction at fixed intervals. The transparent substrate 301 and the small projections 202*d* are formed in one piece. For instance, when light source 200 can print out an image with 2400 dpi, a distance between the small projections 202*d* is about 10 μm.

The small projections 202*d* may be formed on a transparent substrate to be the substrate 301 according to a following etching processing, or by embossing a resin, or may be formed with transparent substrate 301 in one piece by injection molding.

Figure 18:
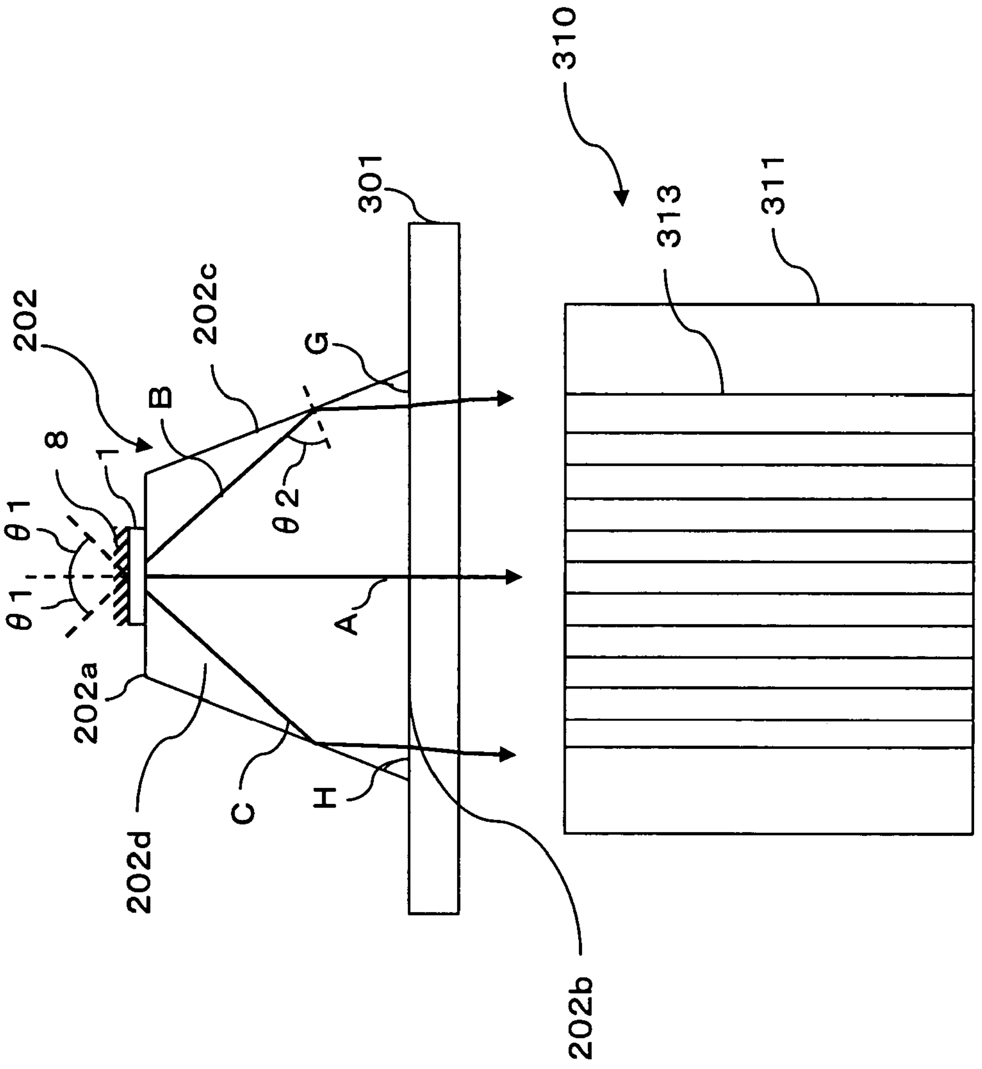
FIG. 18 is a diagram showing a track of a ray of light emitted from a light emitting element.

A shape of each small projection 202*d* may not be a frustum, but may be a shape wherein angles G and H, with each angle formed by the transparent substrate 301 and a side surface 202*c* of the small projection 202*d* as shown in FIG. 18, make an acute angle; that is, the shape may be a frustum, a triangular frustum, a pentagonal frustum, or a polygonal frustum. Material of the small projections 202*d* is to be permeable and preferably have the same refractive index as the light emitting element 8 of the light source 200. Additionally, this embodiment is based on an organic EL (Electro Luminescence) material with a refractive index, about 1.7, as the light emitting element 8; therefore, the material of the projections 202*d* in this embodiment is preferable to have a refractive index of about 1.7.

Figure 19:
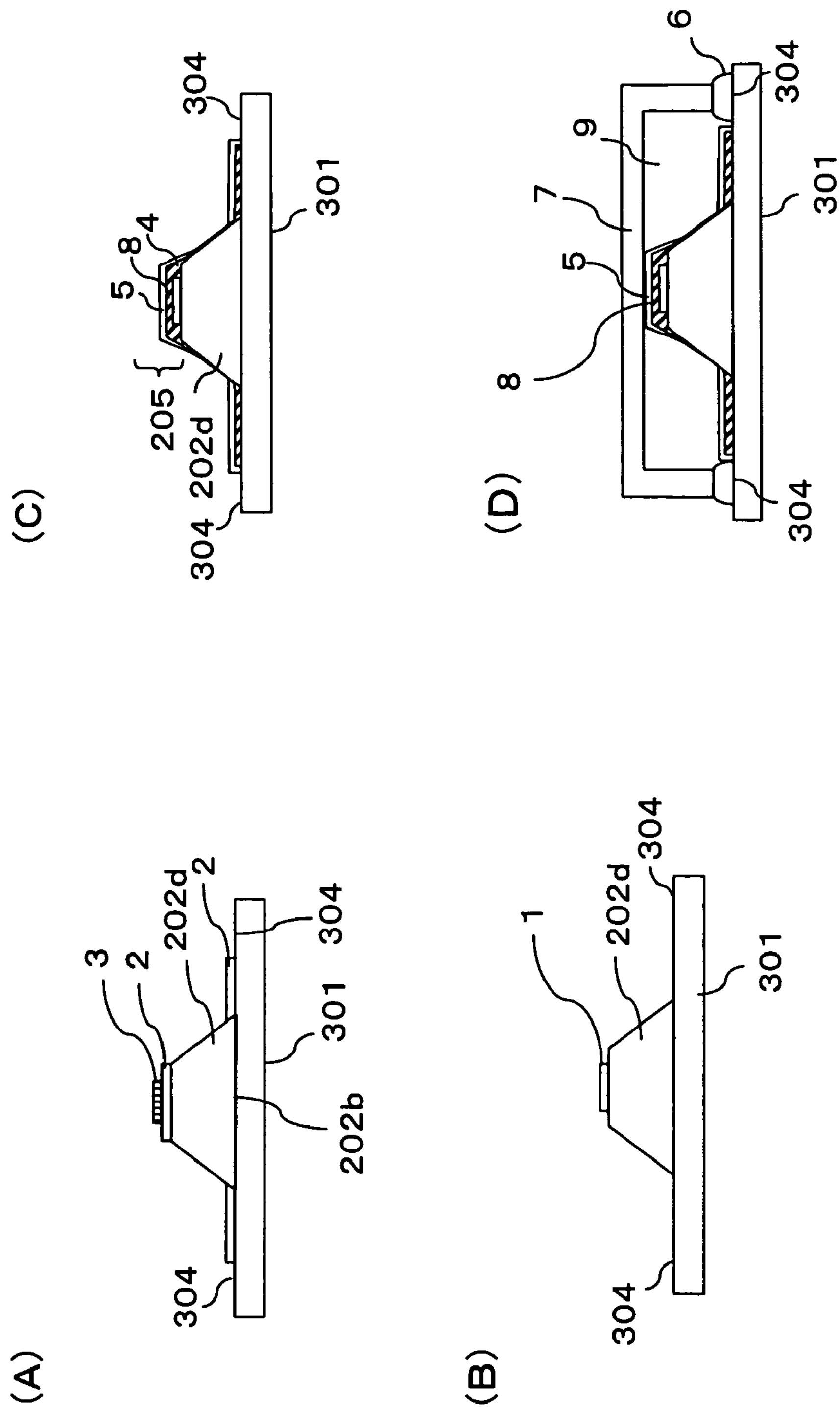
FIG. 19 shows steps (A) to (D) for producing the light emitting element.

The light emitting element 8 shown in FIG. 19(C) is formed on an upper surface 202*a* of each small projection 202*d* according to a method as mentioned hereinafter.

On an upper surface of transparent substrate 301 on which the small projections 202*d* are disposed, transparent electrode layer 2 is applied as shown in FIG. 19(A). Next, a position which is on a center of an upper surface 202*a* of each small projection 202*d*, is masked by a shading film 3, and the transparent electrode layer 2 is subjected to photolithography like exposure, development, and etching. After the photolithography, the transparent electrode layer 2 is removed from parts on which the shading film was not laminated, as shown in FIG. 19(B), and masked parts become transparent electrode elements 1.

Subsequently, organic EL layer 4 is applied on the surface of the transparent substrate 301 including the transparent electrode elements 1 as shown in FIG. 19(C), and on the organic EL layer 4 metal electrode layer 5 is applied as a common electrode. A part of the organic EL layer 4 sandwiched between the metal electrode layer 5 and the transparent electrode element 1 becomes light emitting element 8.

To protect the organic EL layer 4 from physical impact and moisture, resin 6 is applied on sealing section 304, and sealing glass 7 is applied on a rear surface of transparent substrate 301 on which the transparent electrode elements 1, the organic EL layer 4, and the metal electrode layer 5 are formed, as shown in FIG. 19(D). Additionally, a space 9 surrounded by the metal electrode layer 5, the resin 6, and the sealing glass 7 may be under vacuum or filled with nitrogen.

Under the above-mentioned configuration, when a predetermined voltage is applied between the transparent electrode element 1 and the metal electrode layer 5 of light source 200, the light emitting element 8 emits light. Rays A, B and C thus emitted from the light emitting element 8 come from the upper surface 202*a* of the small projection 202*d* into the small projection 202*d* through the transparent electrode element 1 as shown in FIG. 18.

Of the rays A, B and C which come into the small projection 202*d*, ray A has an incident angle θ1 on the upper surface 202*a* which is small; that is, an advancing direction of the ray A is the same as or approximate to an axial direction of fiber lens 313. Accordingly, this ray does not reflect within the small projection 202*d* but emits from a bottom 202*b* of the small projection 202*d* into the transparent substrate 301. On the other hand, rays B and C, of which incident angles θ1 are large, are incident from the upper surface 202*a*, and reach a side 202*c* of the small projection 202*d*.

Since the refractive index of the small projection 202*d* is 1.7, that is larger than the space 9 under vacuum or filled with nitrogen, and the angles ∠G and ∠H are acute angles as shown in FIG. 18 as described above, an incident angle θ2 that the rays B and C with large incident angle θ1 forms with the side 202*c* of the small projection 202*d* becomes large. As a result, it is likely that a ray with a large incident angle θ1, like the rays B and C, performs total reflection on the side 202*c*. By the total reflection, the rays B and C are imparted with directivity close to the axial direction of the fiber lens 303, and then emitted from the bottom 202*b* to the transparent substrate 301.

Therefore, after the ray of light with the large incident angle θ1 passes through the small projection 202*d*, an advancing direction of the light is steered to the same direction as the axial direction of the fiber lens 313. That is to say, by transmitting light through the small projection 202*d*, it is possible to increase a volume of light by converging light within a scope of an angle aperture of the fiber lens 303.

As transparent substrate 301 shown in FIG. 16, another surface (front surface) opposite to the surface on which small projections 202*d* are disposed, is disposed so as to face to the photosensitive drum 106 and sandwich light transmitting structure 310. Accordingly, light thus emitted from bottom 202*b* of the small projection 202*d* passes through the transparent substrate 301, and comes into the light transmitting structure 310.

Since advancing directions of most of light reaching the light transmitting structure 310 are steered to the same as an axial direction of each fiber lens 303 composing the light transmitting structure 310, even if an angle aperture of the fiber lens 303 is small, each ray of light is led into the light transmitting structure 310, and illuminates the photosensitive drum 106 through the light transmitting structure 310.

When the light emitting elements 8 are formed on the transparent substrate 301 provided with the small projections 202*d*, a light transmission efficiency between the light emitting element 8 and the photo-sensitive drum 106 could be improved about four times as high as a configuration without the projections.

Due to directivity structure like the small projection 202*d*, it is not necessary to make the angle aperture of the fiber lens 303 large in order to improve the light transmission efficiency. Accordingly, the light transmitting structure 310 can maintain a long focal depth. This makes it possible to form a clear latent image on the photosensitive drum 106 with ease.

The above-mentioned etching is a dry etching for forming a mesa structure, for example.

Figure 20:
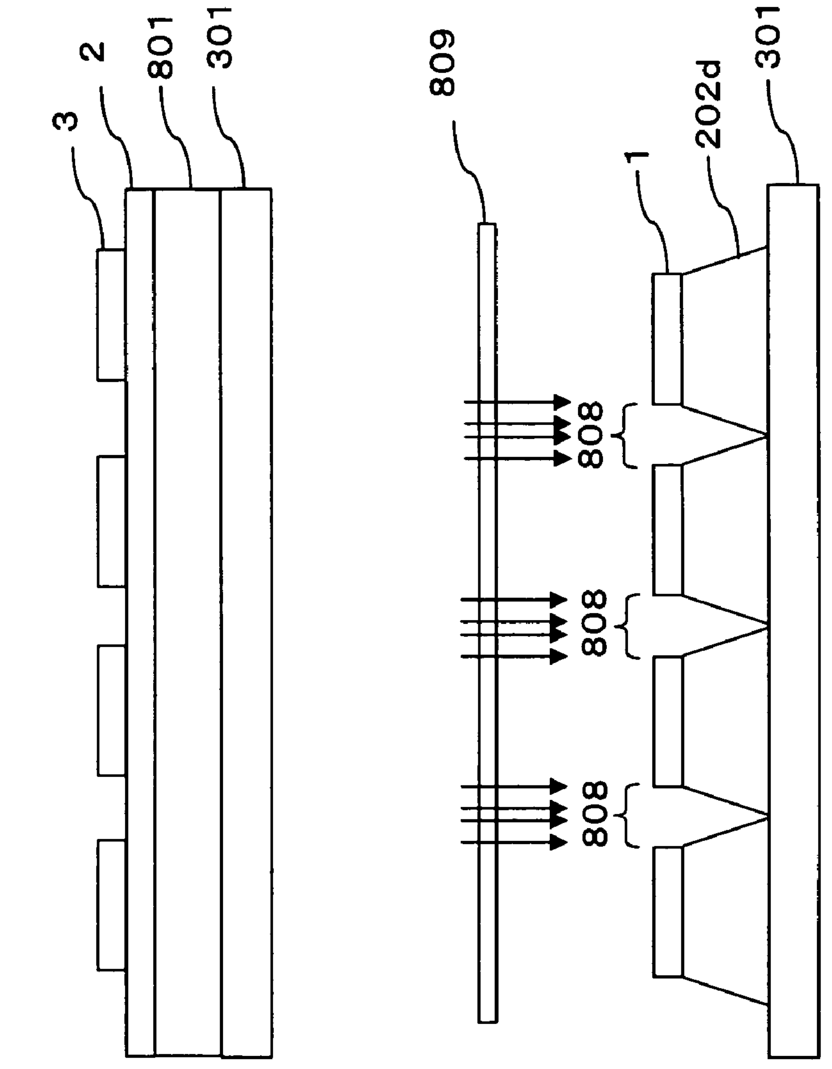
FIG. 20 shows steps (A) to (B) for producing a small projection by means of the anisotropic etching.

When the small projection 202*d* is formed by dry etching, a material to be a directivity imparting layer 801 is applied or evaporated on an entire surface of the transparent substrate 301 as shown in FIG. 20A. Material of the directivity imparting layer 801 is the same as the small projection 202*d*. In a next step, transparent electrode layer 2 is formed on an upper surface of the directivity imparting layer 801 by coating or evaporation. Positions to form a transparent electrode element 1 on the transparent electrode layer 2 are covered by shading film 3.

Regarding the transparent substrate 301 on which the transparent electrode layer 2 is formed as above, a reacting species is brought to a side forming section (sections 808) through a mask 809 for controlling a depth of etching. The depth of the etching depends on a brought amount. Therefore, the mask 809 applies a metal mesh wherein each size of each aperture is adjusted corresponding to the depth of the etching, for example. That is to say, some parts of the metal mesh corresponding to a deep etching part (a center of the section 808) have large-sized apertures to increase a brought amount of the reacting species, while other parts corresponding to a shallow etching part (end portions of the section 808) have small-sized apertures to reduce a brought amount of the reacting species.

The etching removes the sections filled with the reacting species from the transparent electrode layer 2 and the directivity imparting layer 801, so that a number of projections 202*d* in a shape of polygonal frustum can be formed on the transparent substrate together with the transparent electrode element 1, as shown in FIG. 20B. The projections 202*d* become the directivity means.

As described above, both the directivity imparting layer 801 and the transparent electrode layer 2 are subjected to etching simultaneously, with a result that it is possible to reduce steps of producing a light source. And, where the transparent electrode element 1 is formed separately from the directivity imparting structure, positioning for masking is required; however, such positioning becomes unnecessary by performing the etching simultaneously.

Embodiment 6

Figure 21:
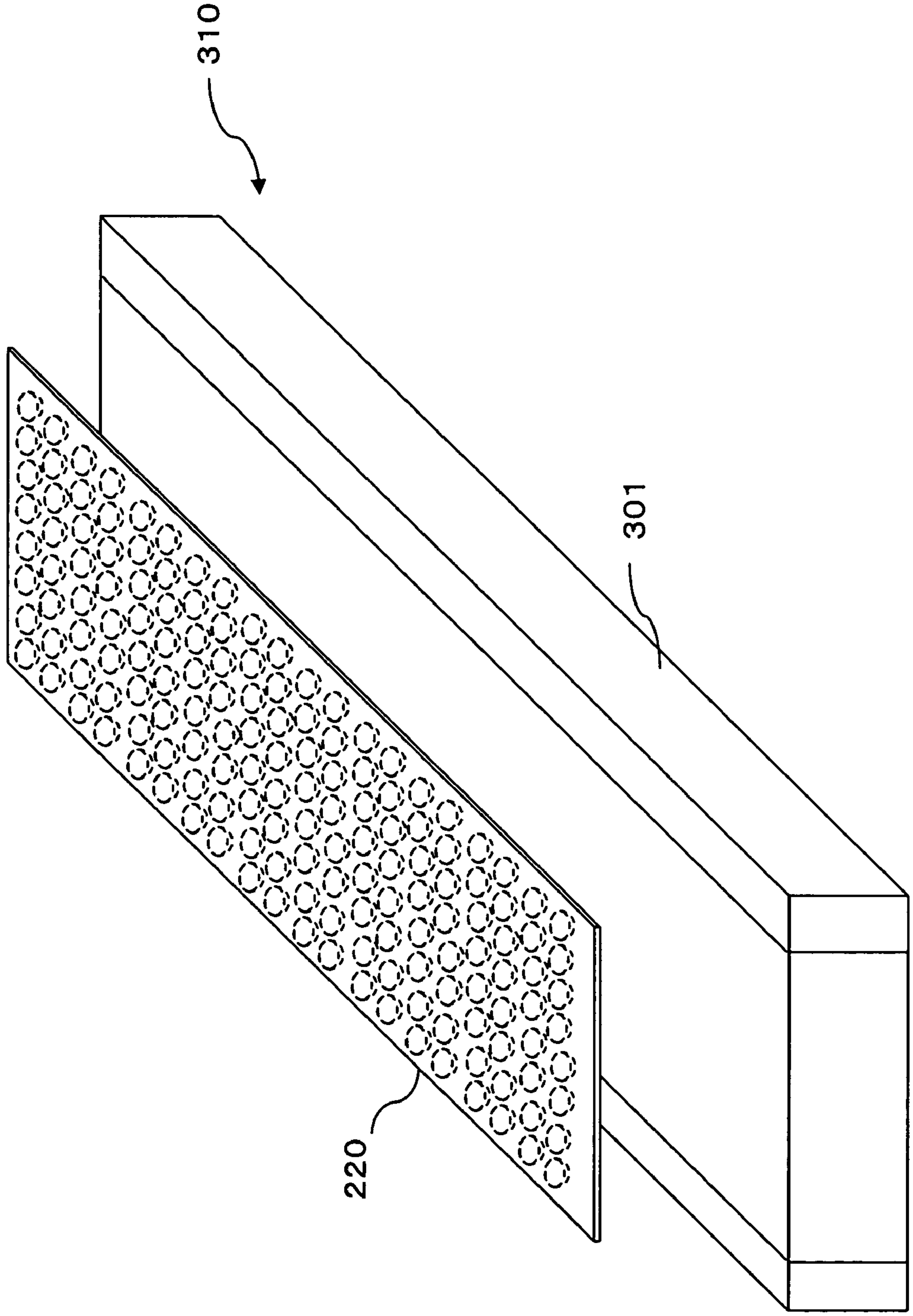
FIG. 21 is a general view of a bead sheet and light transmitting structure.

The above-mentioned directivity structure may be configured by a beads sheet 220 of which projections are formed on a surface of transparent substrate 301 extended in a main scanning direction by injection molding, with the surface facing light transmitting structure 310, as shown in FIG. 21. In a case of using the beads sheet 220 as the directivity structure, light emitting elements 8 are formed on another surface of the beads sheet 220 opposite to a surface on which the projections are formed, according to the following method.

Figure 22:
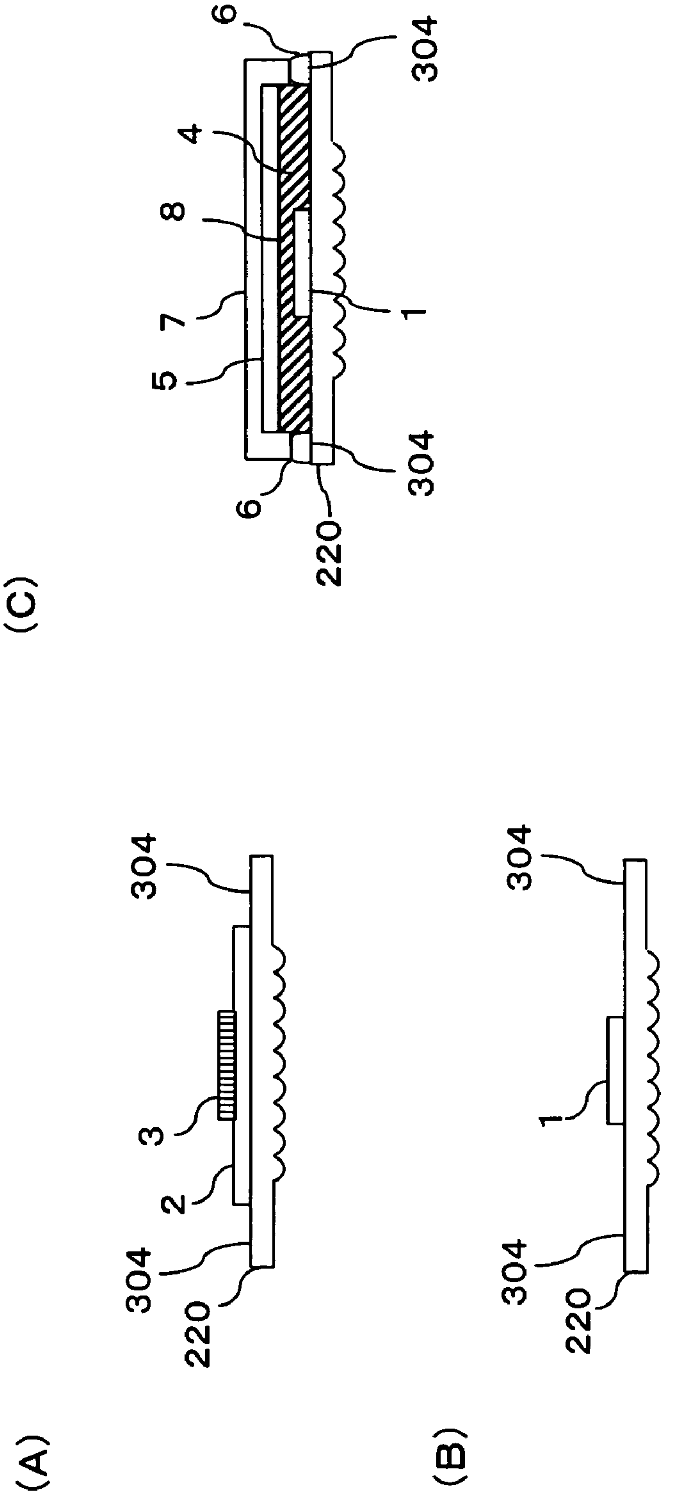
FIG. 22 shows steps (A) to (C) for producing the light emitting element on the bead sheet.

First, transparent electrode layer 2 is applied on a surface of the beads sheet 220, which is opposite to the surface with the projections, as shown in FIG. 22(A). And then, a position on the transparent electrode layer 2, where transparent electrode element 1 should be formed, is covered with shading film 3, like Embodiment 5.

And, photolithography is performed, which forms the transparent electrode element 1 on a part masked by the shading film, as shown in FIG. 22(B). After that, organic EL layer 4 and metal electrode layer 5 are formed in the same way as in Embodiment 5. As a result, the organic EL layer 4 sandwiched between the transparent electrode element 1 and the metal electrode layer 5 becomes light emitting element 8. Additionally, like Embodiment 5, for a purpose of protecting the organic EL layer 4 from physical impact and moisture, resin 6 is applied on sealing section 304, and the metal electrode layer 5 and the resin 6 are covered by sealing glass 7.

Figure 23:
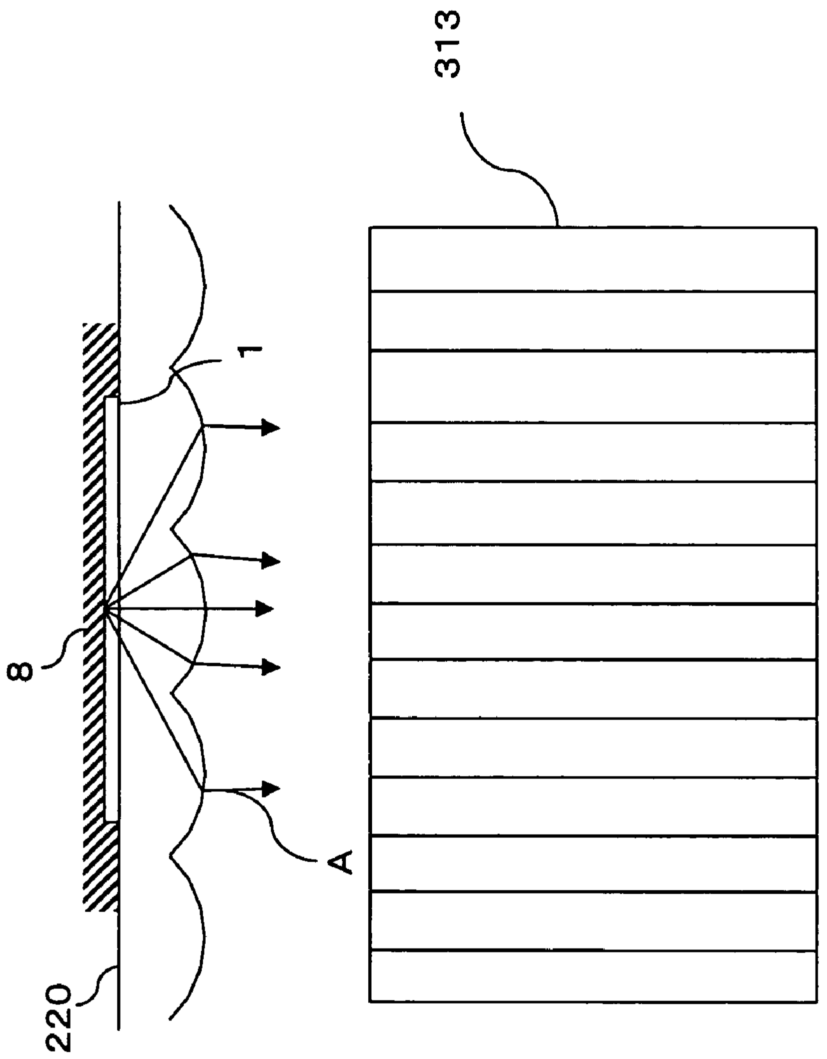
FIG. 23 is a diagram showing a track of a ray of light emitted from a light emitting element.

Under such a configuration, ray A emitted from the light emitting element 8 is incident into the beads sheet 220 through the transparent electrode element 1 as shown in FIG. 23. The beads sheet 220 is provided with the projections on a surface facing light transmitting structure 310. There is a possibility that the ray A, at a time of exiting the beads sheet 220, has a smaller angle relative to the projections than when ray A is emitted from a surface without projections. Therefore, the projections can reduce leakage of light emitted from the beads sheet 220, with a result that it is possible to increase a volume of light emitted from the beads sheet 220 to the light transmitting structure 310.

When light is emitted from the beads sheet 220, the light is imparted with directivity because of a difference of a refractive index between the beads sheet 220 and an exterior. That is to say, the light changes an advancing direction to an axial direction of fiber lens 303.

The beads sheet 220 used as directivity structure as described above can emit a large volume of light as well as can impart directivity to the light. As a result, when light emitting elements 8 are formed on the beads sheet 220, a light transmission efficiency between the light emitting element 8 and the photosensitive drum 106 could be improved about twice as much as a configuration without the projections.

Additionally, the projections provided with the beads sheet 220 may be of a shape that is able to impart light with directivity as well as emit a larger volume of light from the beads sheet 220, such as a cone, a frustum of a cone, a dome, a triangular pyramid, a rectangular pyramid, and the like.

And, a size of the projections of the beads sheet 220 is not limited in particular, but it is desirable to be smaller than the light emitting element 8. For instance, if the size of each projection is the same as the light emitting element 8, assembling of light source 200 requires a step of positioning to correspond the projection to the light emitting element 8 so that light from the light emitting element 8 might be discharged from one projection. But, for a projection smaller in size, a number of the projections through which light from each light emitting element passes becomes approximate to a number of the light emitting elements 8 without positioning of the projection and the light emitting element 8. Therefore, it is possible to diminish dispersion of transmission efficiency of the light from each light emitting element 8 and directivity to be imparted.

In addition, since the beads sheet 220 is provided with functions of both the directivity structure and the transparent substrate 301 as described above, it is possible to omit a positioning step of the small projections 202*d* as described in Embodiment 1 from an assembling process of a light source provided with the beads sheet 220.

Embodiment 7

Figure 24:
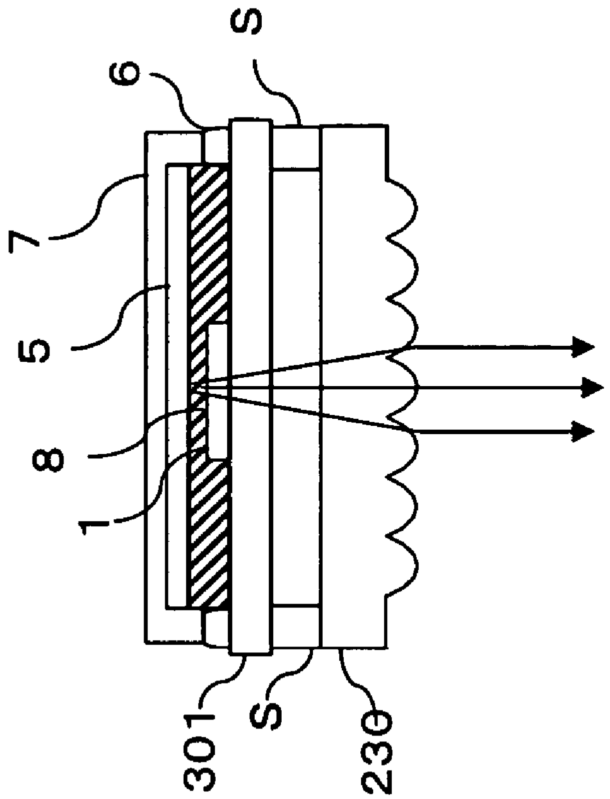
FIG. 24 shows a light source of an image writing apparatus using a micro lens alley as directivity structure.

In Embodiment 7, instead of the beads sheet 220 with the projections provided for the transparent substrate 301 as the directivity structure, a micro lens alley 230 may be disposed between the transparent substrate 301 and the light transmitting structure 310 as the directivity structure, as shown in FIG. 24.

A production process for forming light emitting element 8 on the transparent substrate 301 is the same as in Embodiment 6 except for a step that each light emitting element 8 is formed on the transparent substrate 301 without projections.

The micro lens alley 230 to be used as the directivity structure is produced by injection molding or by irradiating ultraviolet rays on to a photosensitive glass.

The micro lens alley 230 is supported by the transparent substrate 301 through a spacer S as shown in FIG. 24, for example.

Light from the light emitting element 8 is incident to the micro lens alley 230 through the transparent substrate 301, and when the light is emitted from the micro lens alley 230, an advancing direction of the light is converted in the same way as emitting the light from the beads sheet 220. Thus, most advancing directions of the light are converted to the same direction as an axial direction of fiber lens 303.

Additionally, a size of the micro lens is not limited in particular, but it is desirable to be smaller than transparent electrode element 1 like the size of a projection of the beads sheet 220.

Embodiment 8

The above embodiment relates to a configuration so as to improve transmission efficiency of light between the light emitting element 8 and the photosensitive drum 106 by changing an advancing direction of the light, and illuminance on the photosensitive drum. The following explains a configuration so as to improve illuminance on the photosensitive drum by improving a luminous intensity of each light emitting element 8.

In order to improve the luminous intensity of each light emitting element 8, respective light emitting elements 8 in this embodiment have a large luminous area. As described above, in order to print an image with high resolution, each light emitting element 8 must be disposed at a small interval in the main scanning direction. Accordingly, a length of the light emitting element 8 in the main scanning direction is limited.

However, regarding the sub-scanning direction, the length is not limited at all. Accordingly, if the length of the light emitting element 8 is extended in the sub-scanning direction, a size of the light emitting elements 8 can be enlarged. Light emitted from the light emitting element 8 extended in the sub-scanning direction has a long section in the sub-scanning direction. As a result, a latent image formed on the photosensitive drum 106 has pixels extended relative to the sub-scanning direction. In order to prevent the pixels from being extended relative to the sub-scanning direction, a length of a section of the light in the sub-scanning direction must be the same as that in the main scanning direction before the light emitted from the light emitting element 8 reaches the photosensitive drum 106.

In this embodiment, light guide 402 is used as a condensing structure for condensing light from the light emitting elements 8 in the sub-scanning direction.

As described in Embodiment 2, the reflection material 404 not permeable to light is layered over the surface 407 opposite to the emitting surface 408 of the light guide 402.

Light guides 402 are disposed on the transparent substrate 301 in the main scanning direction at fixed intervals. The fixed intervals are the same as intervals of pixels of a printing image. Additionally, in order to avoid crosstalk of light incident to each light guide 402, a space between the light guides 402 may be formed as an air layer or filled with material having a refractive index smaller than the light guide 402.

The light emitting elements 8 are formed on each light guide 402 in the same way as forming the light emitting element 8 on the small projection **202*d* in Embodiment 7. It is sure that sealing section 304 is applied with resin 6, and metal electrode layer 5 and the resin 6 are covered with sealing glass 7 in order to protect organic EL layer 4 from physical impact and moisture, which is not shown in FIG. 25**.

Figure 25:
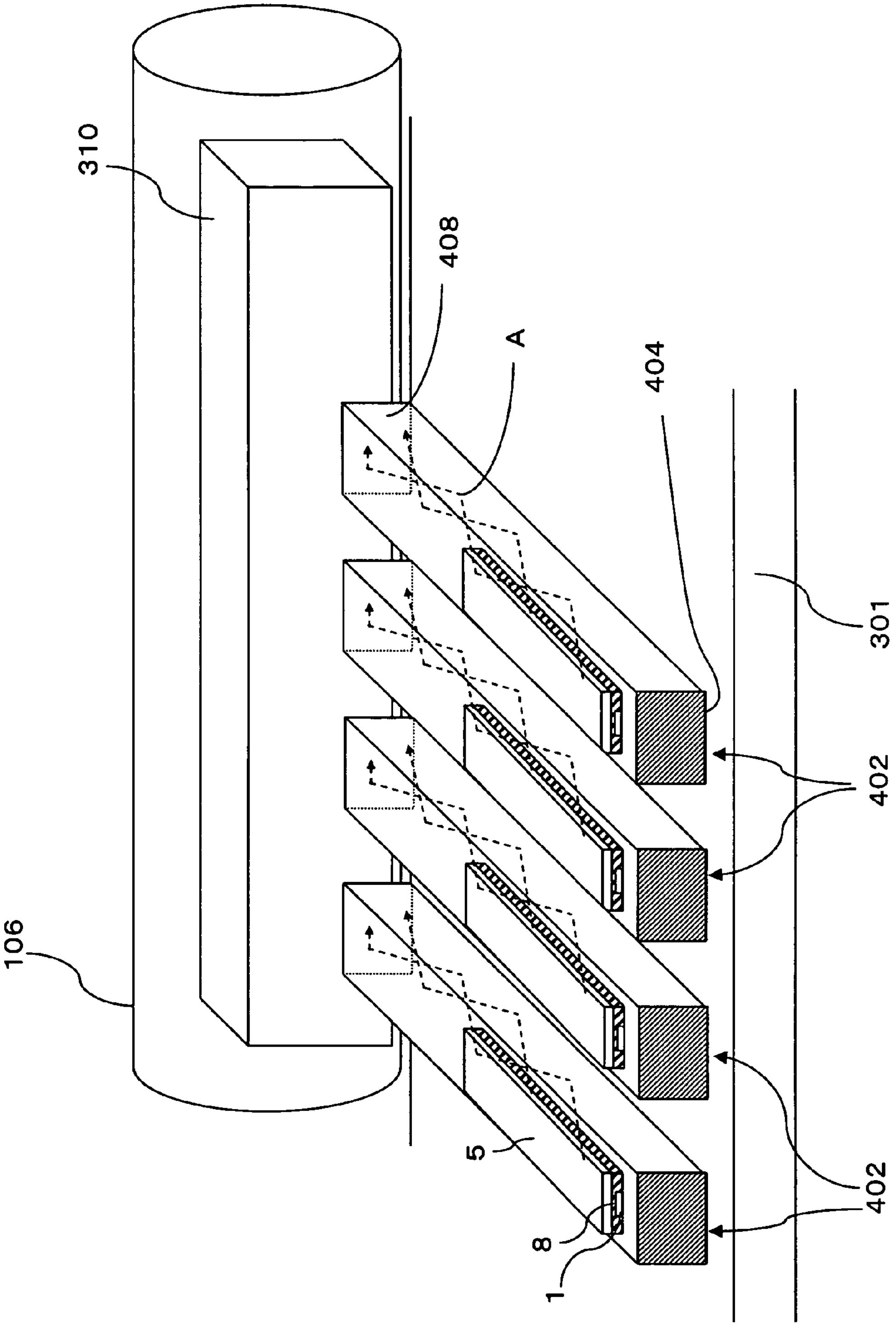
FIG. 25 is an outline view of a light source and a photosensitive drum of an image writing means using a micro lens alley as directivity structure.
Figure 26:
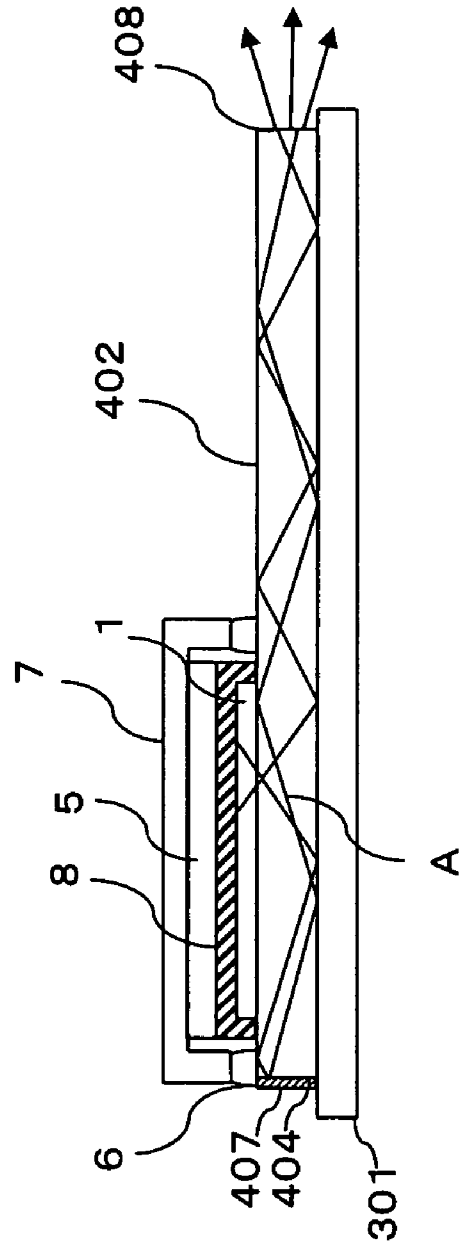
FIG. 26 is a diagram showing a track of a ray of light emitted from a light emitting element.

In a sectional view (FIG. 26) of FIG. 25, ray A emitted from the light emitting element 8 is incident to the light guide 402 through the transparent electrode element 1. That the light guide 402 has a refractive index larger than the transparent substrate 301, a vacuum status, or air, and the reflection material 404 is layered over the surface 407 of the light guide 402. The ray A incident to the light guide 402 is reflected within the light guide 402 repeatedly, and then the ray exits from the emitting surface 408. As the ray A emitted from the light emitting element 8 is emitted from emitting surface 408, a section of the light emitted from the light emitting element 8 is the same size as the emitting surface 408.

Therefore, a section of the emitting surface 408 may be formed so as to have the same area as an area required for pixels of a latent image formed on the photosensitive drum 106. As a, result, even if a luminous surface of the light emitting element 8 has any shape, the section of the light emitted from the emitting surface 408 is the same area as required.

Accordingly, the larger the luminous area of the light emitting element 8 becomes, the more the luminous flux density of the light emitted from the emitting surface 408 can increase. Since a length of the ray emitting element 8 in the sub-scanning direction is not limited in particular as mentioned above, the light emitting element 8 may be formed on the light guide 402 so as to be long in the sub-scanning direction. This makes it possible to obtain a high luminous flux density on the emitting surface 408. In addition, since the light is condensed in the sub-scanning direction, it is possible to obtain on the emitting surface 408 the light with the high luminous flux density and with the same length both in the main scanning direction and the sub-scanning direction.

Light source 200 provided with the light guide 402, wherein the light is emitted from the emitting surface 408, is provided with light transmitting structure 310 in front of the light emitting surface 408 as shown in FIG. 25. The light emitted from the emitting surface 408 illuminates the photosensitive drum 106 through the light transmitting structure 310 in the same way as described in Embodiments 5 through 7.

Therefore, the condensing structure makes it possible to obtain light with high luminous flux density even in the light source 200, wherein the light emitting elements 8 are formed in the main scanning direction at short intervals. Therefore, a light source with the condensing structure can form a latent image with high resolution.

Additionally, a luminescence life of the light emitting element 8 does not become short in using the light guide 402 as the condensing structure, because it is not necessary to apply a large electric field on the transparent electrode element 1 and the metal electrode layer 5 in order to obtain light with high luminous flux density as conventionally.

Figure 27:
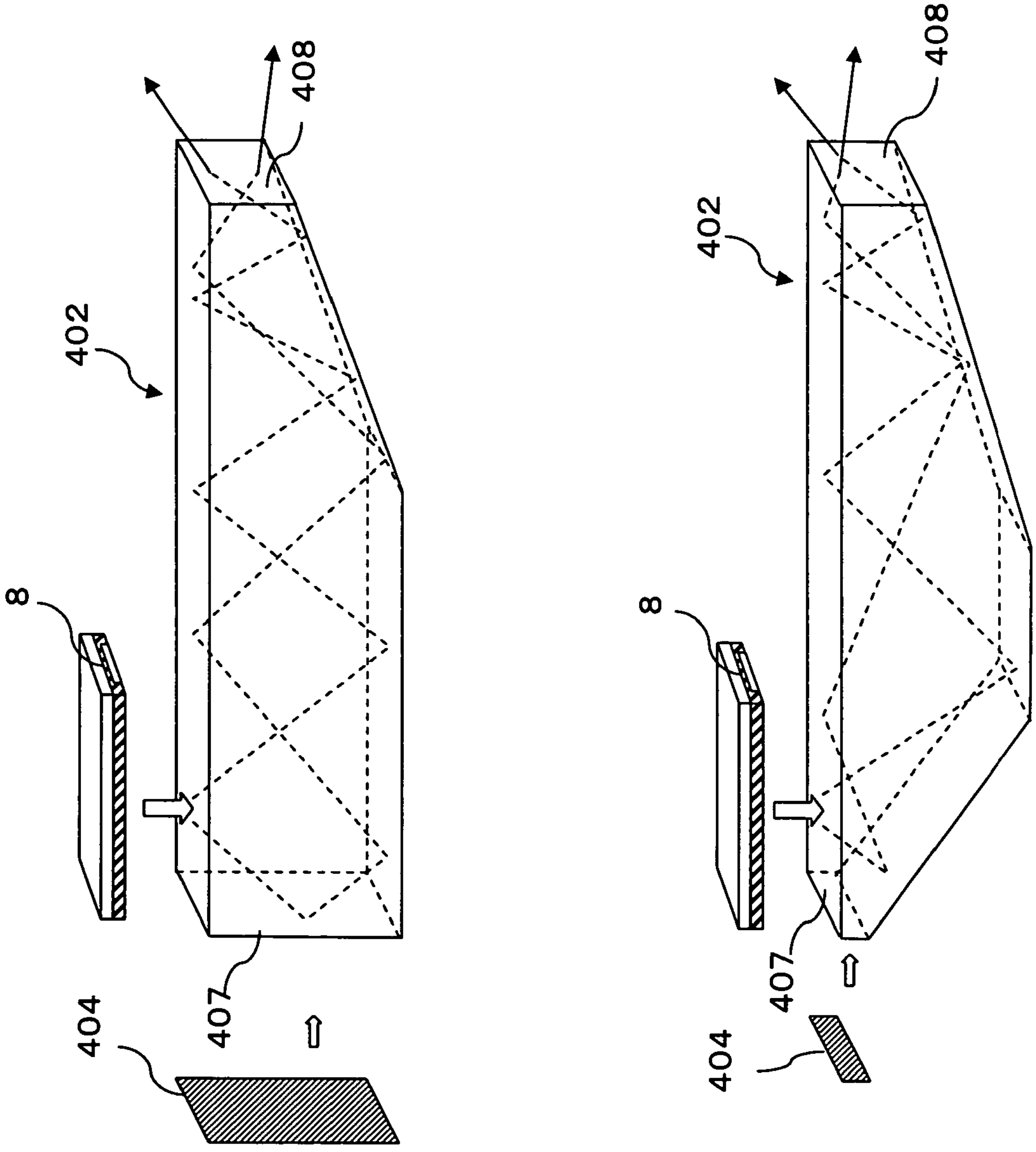
FIG. 27 is a diagram showing a track of a ray of light emitted from a light emitting element.

Moreover, a shape of the light guide 402 is not limited to a rectangular parallelepiped shown in FIG. 25. For instance, the shape may be a polygonal prism like a pentagonal prism or a hexagonal prism, or a shape with a polygonal bottom and an upper surface of a frustum of a cone as shown in FIG. 27.

Figure 28:
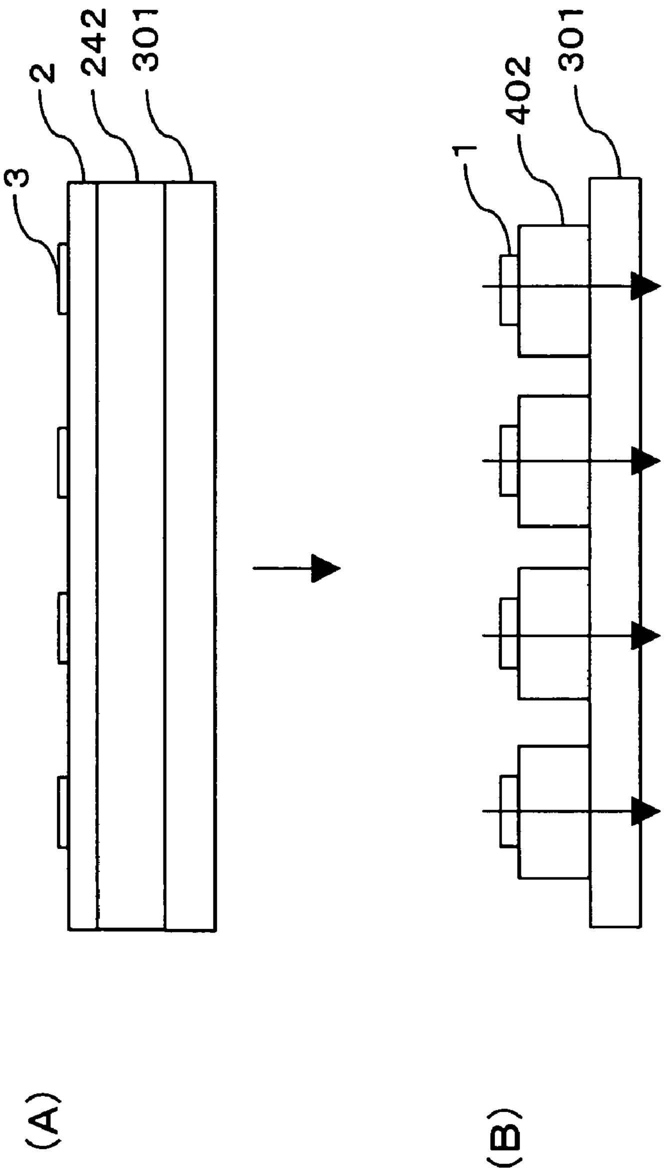
FIG. 28 shows steps (A) to (B) for producing the light guide by means of the etching.

Additionally, although the light guide 402 may be produced by injection molding, it may be produced by etching as follows. For instance, a material 242 to be the light guide 402 is applied on the transparent substrate 301, and then transparent electrode layer 2 is applied thereon, as shown in FIG. 28(A). Next, a position to form transparent electrode element 1 on the transparent electrode layer 2 is masked by shading layer 3, and then the transparent electrode layer 2 and the material 242 are subjected to etching. Hereupon, the transparent electrode element 1 and the light guide 402 are produced as shown in FIG. 28(B).

As described above, since a sectional area of light emitted from the light emitting element 8 can be made to be the same size as pixels of the latent image by the light guide 402, if the light guide 402 is disposed so that the emitting surface 408 is closer to the photosensitive drum 106, the light source 200 does not need to be provided with the transmitting structure 310.

And, if the emitting surface 408 is a convex surface such as a convex lens, light from the emitting surface 408 is allowed to form an image on the photosensitive drum 106. It is needless to say that it is not necessary to provide the light source with the light transmitting structure if the emitting surface 408 is convex.

Embodiment 9

Figure 29:
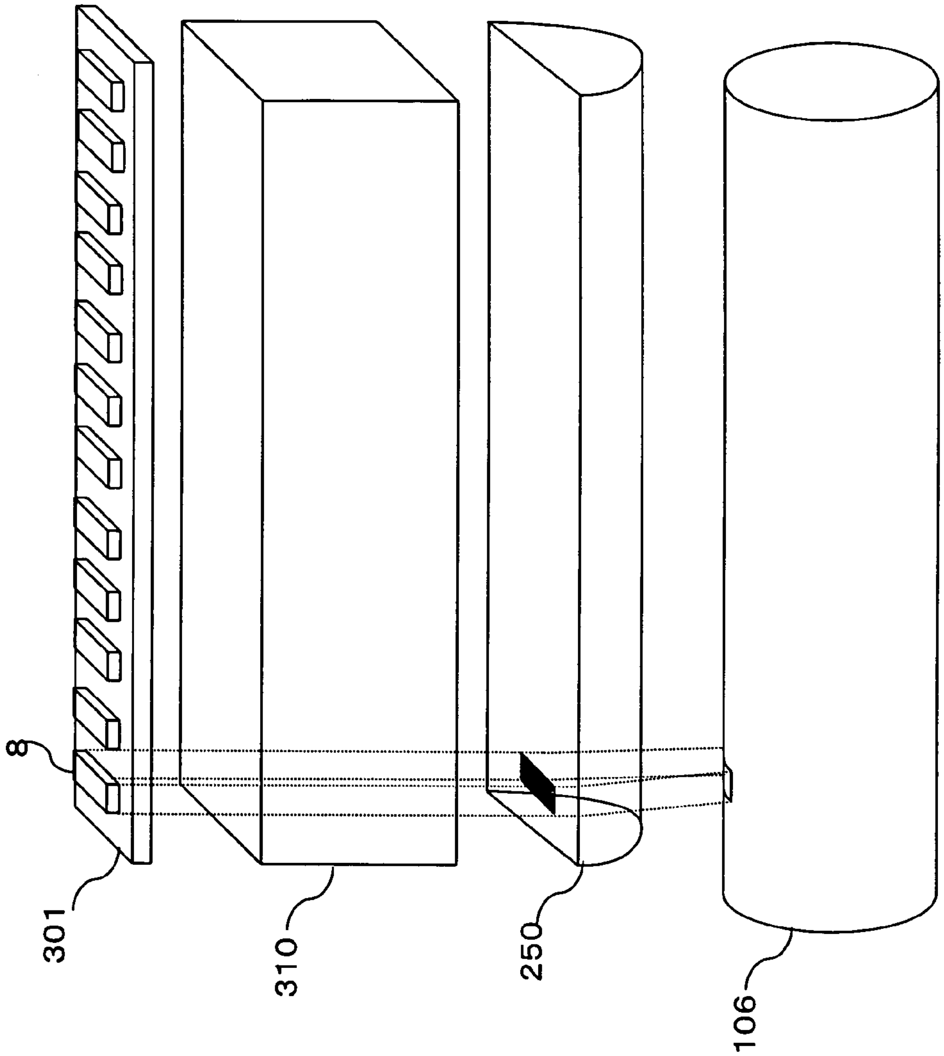
FIG. 29 is an outline view of a light source and a photosensitive drum using a cylindrical lens as condensing structure.

A convex cylindrical lens 250 may be used as condensing structure, instead of the light guide 402. In such case, the cylindrical lens 250 may be disposed between the light transmitting structure 310 and the photosensitive drum 106 so as to direct a curved surface to the photosensitive drum 106 as shown in FIG. 29. The cylindrical lens 250 should be supported by the light transmitting structure 310 through a spacer not shown in this figure, or by a housing of printer 100.

Light emitting element 8 may be formed on transparent substrate 301 in the same way as Embodiment 6, but the light emitting element 8 in this embodiment is longer in a sub-scanning direction than in a main scanning direction, which is different from embodiment 6. A length of the light transmitting element 8 is long in the sub-scanning direction because the main scanning direction is limited as described in Embodiment 8. Additionally, FIG. 29 does not show, but it is also a matter of course in this embodiment that metal electrode layer 5 may be covered by resin 6 and sealing glass 7 in order to protect organic EL layer 4.

As shown in FIG. 29, light emitted from the light emitting element 8 is incident into the cylindrical lens 250 through the transparent substrate 301 and the light transmitting structure 310. The light incident to the cylindrical lens 250 is narrowed down to the sub-scanning direction when the light exits from a convex surface of the cylindrical lens. And, a section of the light on the photosensitive drum has the same length both in the main scanning direction and the sub-scanning direction.

If the cylindrical lens 250 is used as the condensing structure, it is possible to freely change a length of the section of the light in the sub-scanning direction on the photosensitive drum 106 by adjusting a radius of curvature or a refractive index of the cylindrical lens 250, or by adjusting a distance between the cylindrical lens 250 and the photosensitive drum 106.

Therefore, like Embodiment 8, if the length of the light emitting element 8 is as long as possible in the sub-scanning direction, and the cylindrical lens 250 is adjusted in terms of the radius of curvature and the refractive index, and the distance between the cylindrical lens 250 and the photosensitive drum 106 is adjusted, it is possible to obtain light with a high luminous flux density and with the length of the section that is the same in the main scanning direction as in the sub-scanning direction. However, if the light is condensed in the sub-scanning direction only, the focal length of light becomes short only in the sub-scanning direction, and a difference occurs between the focal length of the sub-scanning direction and the focal length of the main scanning direction. Accordingly, when the sub-scanning direction of the light emitting element 8 is much longer than the main scanning direction, the focal length of the sub-scanning direction has a large difference from the focal length of the main scanning direction. And then, it is not possible to obtain a clear latent image on the photosensitive drum 106.

Additionally, the description of Embodiment 9 relates to a case where the convex cylindrical lens 250 is used as the condensing structure; however, instead of the convex cylindrical lens 250, a micro lens ally 260 may be used as the condensing structure.

Figure 30:
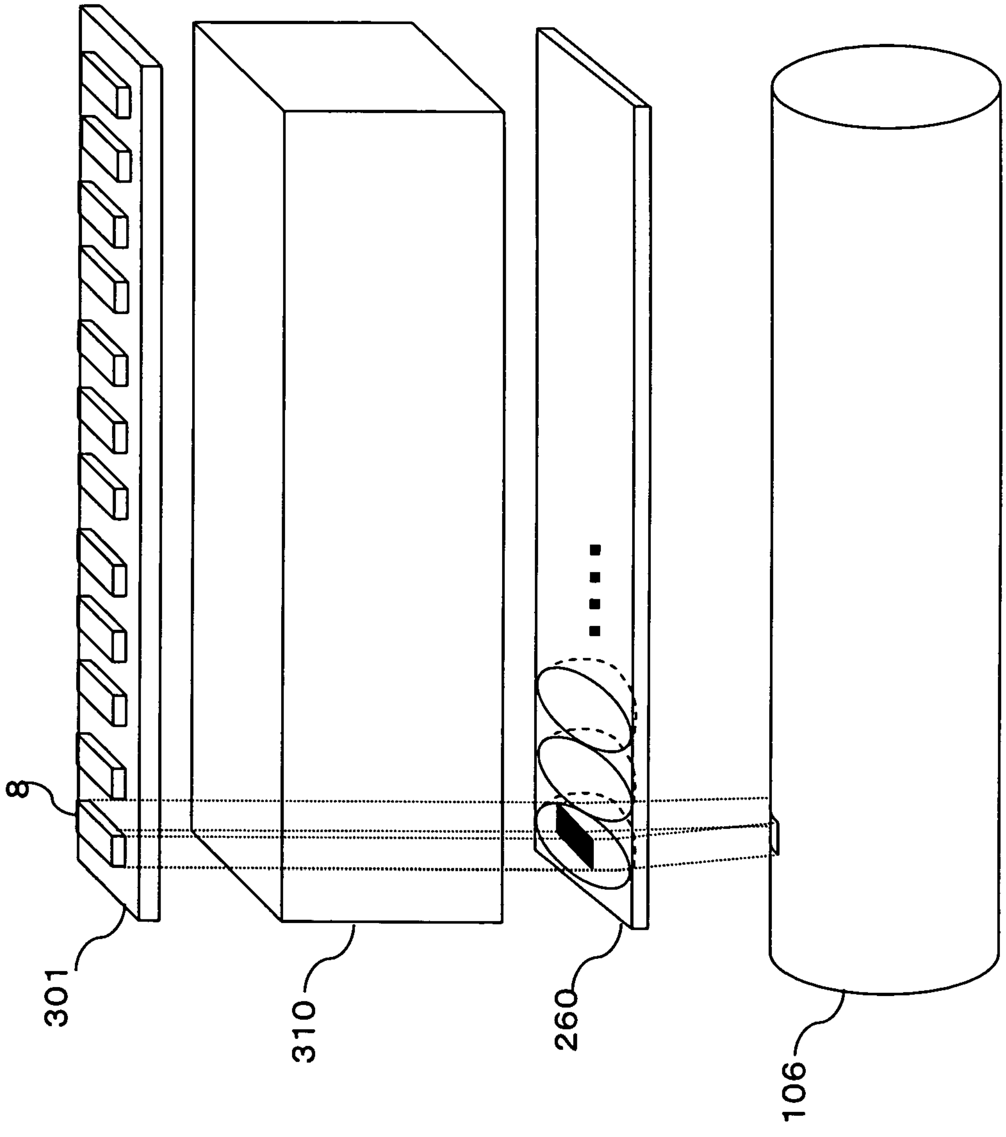
FIG. 30 is an outline view of a light source and a photosensitive drum using a micro lens as condensing structure.
Figure 31:
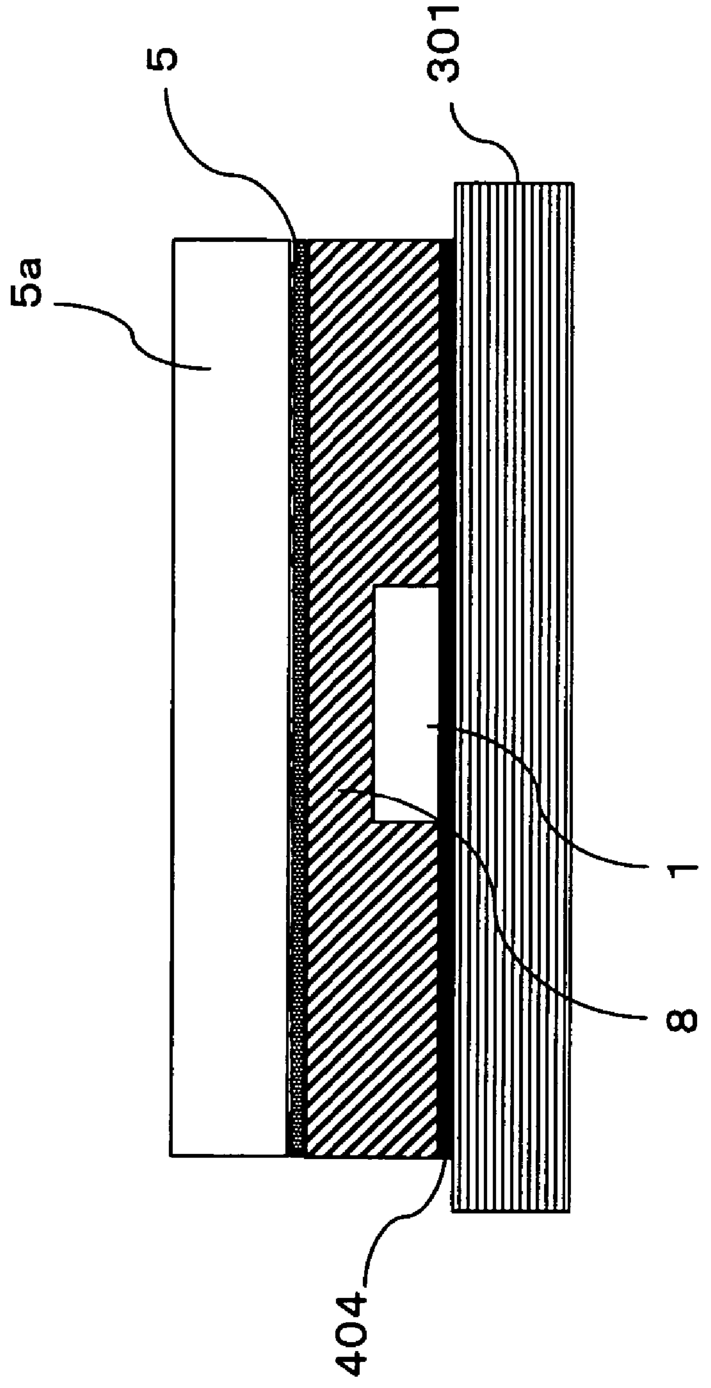
FIG. 31 is an enlarged diagram of a peripheral portion of a light emitting element when a ray of light emitted from the light emitting element is emitted to a metal electrode layer side.

The micro lens ally 260 as the condensing structure is formed as shown in FIG. 30 so that the micro lenses may be arranged in a line in the main scanning direction, wherein a shape of each micro lens is oval of which a long axis is in parallel with the sub-scanning direction. A purpose of forming such oval is to narrow light down in the sub-scanning direction.

The cylindrical lens 250 or the micro lens alley 260 is disposed between the light transmitting structure 310 and the photosensitive drum 106 as shown in FIG. 29 and FIG. 30; however, the light transmitting structure 310 may be disposed just above the cylindrical lens 250 or the micro lens alley 260.

In addition, if the light transmitting structure 310 is composed of an image transmitting type of lens, the light transmitting structure 310 may be disposed just above the cylindrical lens 250 or the micro lens ally 260.

Embodiment 10

In Embodiments 5 through 9, respective layers are formed in the order, the transparent electrode element 1, the organic EL layer 4, and the metal electrode layer 5. Therefore, light emitted from the light emitting element 8 is discharged to the side of the transparent substrate 301 as shown in FIG. 16.

But, the light source 200 may emit light to another side opposite to the direction described in Embodiments 5 through 9, that is to say, the light may be emitted upwardly as shown in FIG. 16.

Since the light emitting element 8 is provided with the opaque metal electrode layer 5 on the upper side as described in Embodiments 5 through 9, light cannot be emitted upwardly. As described in Embodiment 4, in order to improve the light emitting efficiency of the organic EL layer, the cathode must be of a material whose work function is lower than the transparent electrode element 1 that is to be the anode, and the opaque metal electrode layer 5 is used as the cathode.

Now, in order to emit light upwardly, the metal electrode layer 5 is formed so as to have a thickness (about 100 Å) as far as the light is transmitted. Thereby, the light can be emitted upwardly. But, the light is allowed to be discarded downwardly, too. To avoid the light from discharging downwardly, reflection material 404 is provided between the transparent substrate 301 and the transparent electrode element 1.

Besides, like Embodiment 4, electrode layer **5*a* is formed on metal electrode layer 5 so as to flow an electric current uniformly on thin metal electrode layer 5. Also in this embodiment, organic EL layer 4, the metal electrode layer 5 and the electrode layer 5*a* are covered with resin 6 and sealing glass 7 for the protection of the organic EL layer 4**.

Figure 32B:
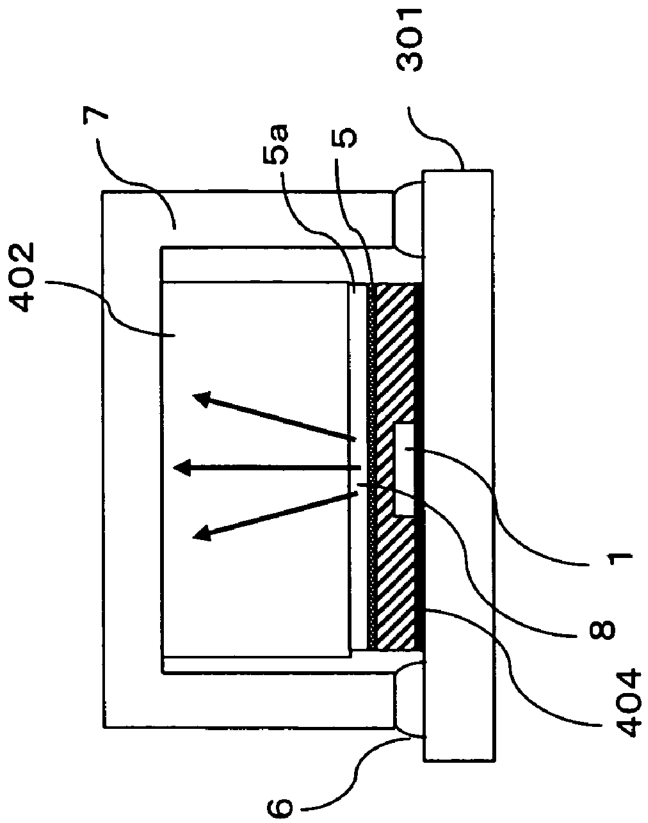
FIGS. 32A and 32B show examples of the light source when the ray of light emitted from the light emitting element is emitted to the metal electrode layer side.
Figure 32A:
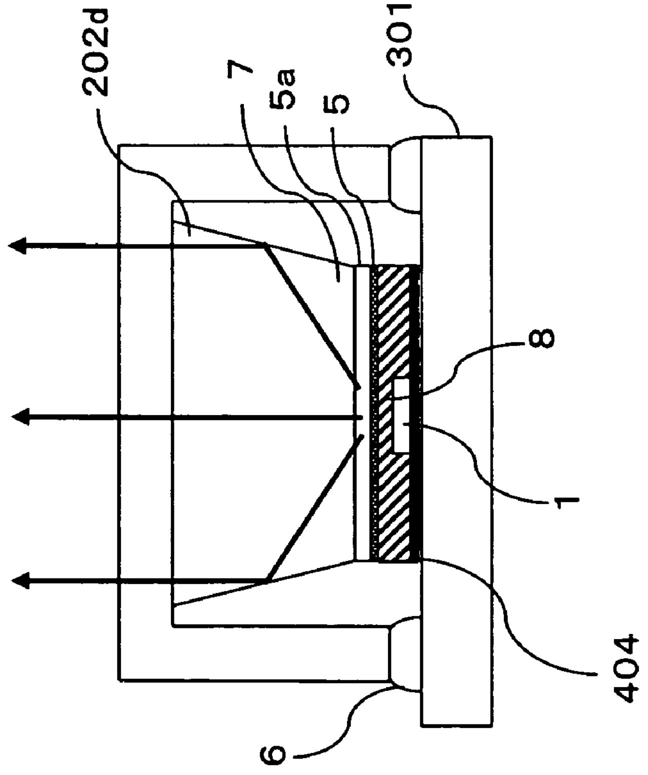

As described above, small projection **202*d* or light guide 402 is formed on the electrode layer 5*a*, and the sealing glass 7 covers light emitting element 8 and the small projection 202*d*, or the light guide 402, which are shown in FIG. 32A and FIG. 32**B.

Embodiment 11

Figure 33:
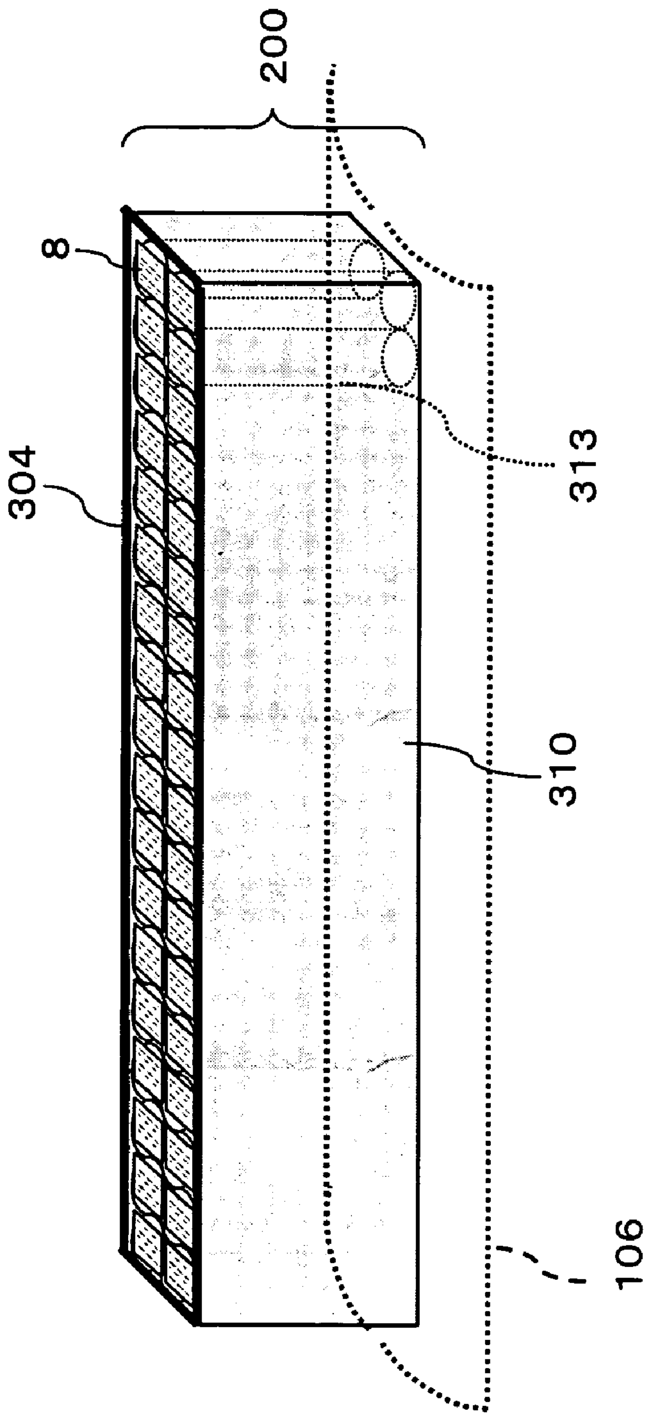
FIG. 33 is an outline view of a light source in Embodiment 11 of the invention.

Light source 200 in this embodiment as shown in FIG. 33 is composed of light transmitting structure 310 and light emitting element 8. The light transmitting structure 310 is for exactly forming a latent image on the photosensitive drum 106 as described above. The light emitting element 8 is configured by a flat luminous layer. Organic electro luminescence (which is called organic EL) material is applied to an example of the flat luminous layer.

Additionally, one of light emitting elements 8 is provided on the light transmitting structure 310 so as to correspond to one of fiber lenses 313 (which is called a single lens 313) composing the fiber lens alley shown in FIG. 6A. Light from the light emitting element 8 illuminates the photosensitive drum 106 through a corresponding single lens 313, and then a latent image is formed thereon.

Next, the light emitting element 8 is formed directly on the light transmitting structure 310, of which a production method is described hereinafter.

Figure 34:
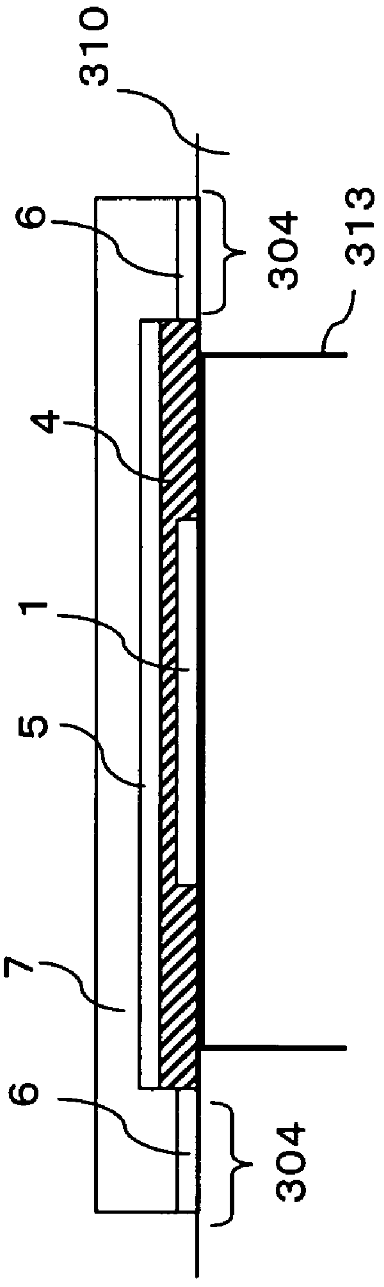
FIG. 34 is an outlined block diagram of a light emitting element.

The transparent electrode layer 2, such as the ITO electrode to be the material of the transparent electrode element 1, is formed on whole opening surfaces (the sectional surfaces of the single lenses 313) of the light transmitting means 310 by the evaporation or the application as shown in FIG. 34. Thereby, the transparent electrode layer 2 is attached tightly to the light transmitting means 310 in optical.

And then, an upper section of each single lens 313 in this embodiment, from which the light transmitting structure emits a ray of light, is masked with shading film 3 regarding this section only. And an opening surface is subjected to photolithography like exposure and development, or etching, that is, patterning. The patterning removes the transparent electrode layer 2 on parts without masking, while a masked section becomes the transparent electrode element 1.

Next, organic EL layer 4 is formed by applying the organic EL material on the entire surface of the opening surface on which the transparent electrode element 1 is formed, and then, the metal electrode layer 5 is formed on an upper surface on the organic EL layer 4 as a common electrode. The organic EL layer 4 sandwiched between the transparent electrode element 1 and the metal electrode layer 5 becomes a light emitting element.

Additionally, the light emitting element 8 is subjected to sealing as follows. Resin 6 is applied on sealing section 304 surrounding the single lens 313, and as a final operation the metal electrode layer 5 on the opening surface and the resin 6 applied on a periphery thereof are covered with an approximately U-shaped sealing glass 7. As a result, the light source 200 is completed.

According to the above steps, the light source 200 is formed combining the light transmitting structure 310 with the light emitting element 8 optically in one piece. In this formed light source 200, the organic EL layer 4 between the transparent electrode element 1 and the metal electrode layer 5 emits a ray when an electric field is applied to the transparent electrode element 1 and the electrode layer 5.

Since the light emitting element 8 using the organic EL material is formed directly on the light transmitting structure 310, light emitted from the light emitting element 8 is transmitted directly to the light transmitting structure 310 without passing through a low refractive index layer with low directivity. Accordingly, the light can reach the photosensitive drum 106 while maintaining sufficient luminous intensity and no total reflection. Therefore, it is possible to form a latent image with high resolution without shortening a luminescence life of the light emitting element 8 and without a short focal depth due to a large angle aperture. In other words, since there is no total reflection of the light in the light source in this embodiment, when a specific latent image is formed, electric power consumption of this light source can be reduced more than electric power consumption of a light source wherein light goes through a low refractive index layer with low directivity.

Embodiment 12

Figure 35:
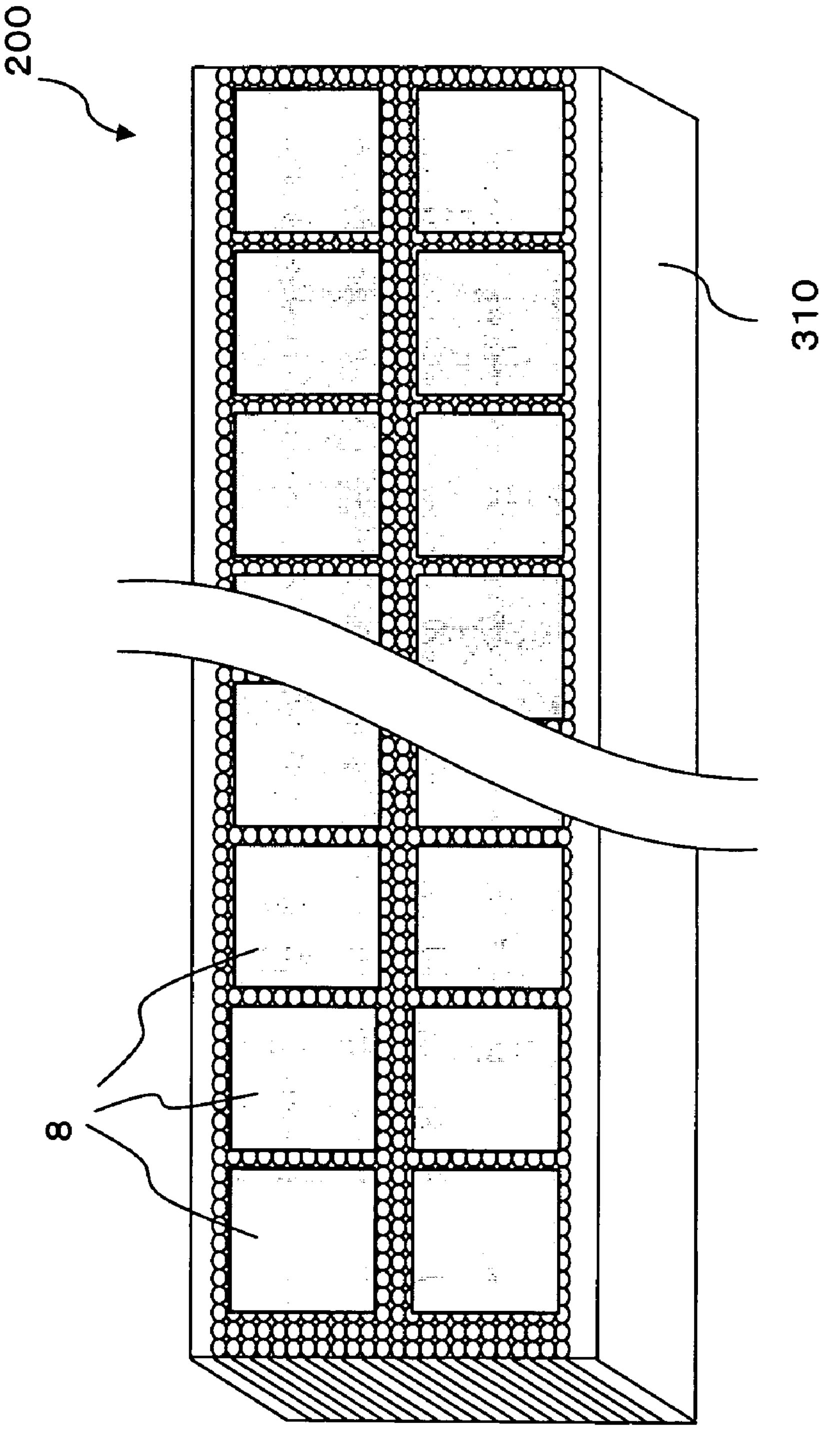
FIG. 35 is an outline view of a light source in Embodiment 12 of the invention.

FIG. 35 shows light transmitting structure 310 composing light source 200, in which each single lens 313 has a diameter smaller than a length and breadth of light emitting element 8, and a configuration is explained hereinafter.

The light source 200 shown in FIG. 35, wherein light emitting elements 8 are disposed on the light transmitting structure 310, employs the single lens 313 of which the diameter is smaller than the length and breadth of the light emitting element 8. That is to say, one of the light emitting elements 8 corresponds to a plurality of single lenses 313.

Regarding the single lens 313, as a specific number of single lenses is one unit, a plurality of single lenses 313 is placed within a space surrounded by light absorbing layers 312 and base frames 311 as shown in FIG. 6B, or placed in the same way after light absorbing layer 312 is provided on a peripheral portion of each single lens 313.

The light emitting element 8 may be formed on this configured light transmitting structure 310, of which a production method is the same as in Embodiment 11. The diameter of the single lens 313 is smaller than the light emitting element 8 under such configuration, so that the light emitting element 8 can be formed regardless of a delicate positioning relationship between the light emitting element 8 and the single lens 313. From this point of view, the light source 200 can be formed simply more than the aforementioned light source 200 that applies the light transmitting structure 310 described in Embodiment 1.

Embodiment 13

Consequently, here is explained about light source 200 that is provided with directivity structure between light emitting element 8 and the light transmitting structure 310 for steering an advancing direction of light emitted from the light emitting element 8 to a predetermined direction, and that is configured by forming the light transmitting structure 310, the directivity structure and the light emitting element 8 in one piece.

Figure 36A:
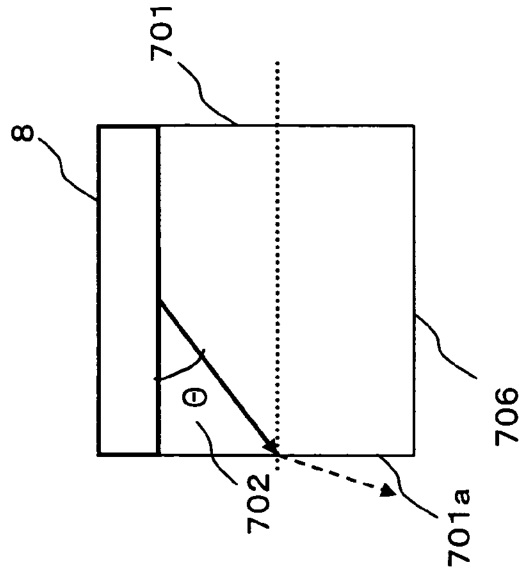
FIG. 36A is a diagram illustrating the non mesa-structure.
Figure 36B:
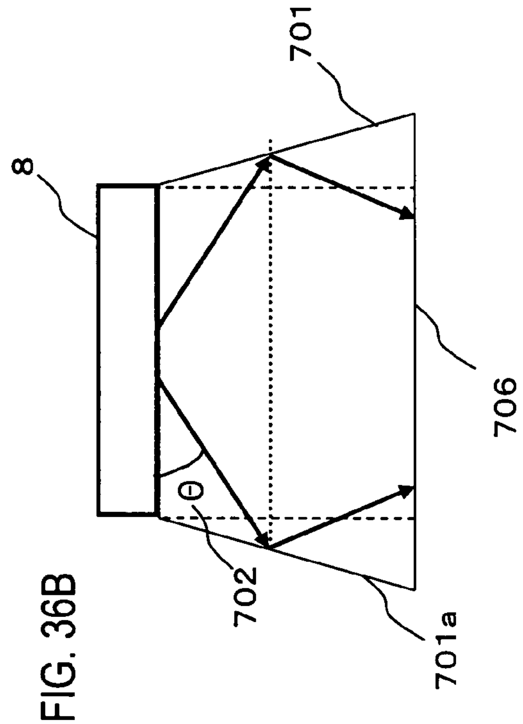
FIG. 36B is a diagram illustrating the mesa-structure.

The directivity structure is for leading more light into the light transmitting structure 310 by correcting the advancing direction of light. The directivity structure in Embodiment 13 is provided with a mesa structure (mesa sheet), which is explained here. The mesa structure is for correcting a light direction to a predetermined direction by reflecting incident light, and is configured in a form of a polygonal frustum of a pyramid wherein the light emitting element 8 is disposed on a side of an upper surface as shown in FIG. 36B. Specifically, directivity structure 701 without the mesa structure shown in FIG. 36A allows side surface 701*a* of the directivity structure 701 to transmit parts of or most of light emitted from the light emitting element 8 at a specific incident angle θ, 702, so that a volume of light incident into bottom 706 could decrease. And, a transmission efficiency could be reduced. On the contrary, directivity structure 701 with the mesa structure of FIG. 36B increases a possibility that light emitted from the light emitting element 8 at a specific incident angle θ, 702, is reflected on the side surface 701*a* of the directivity structure 701, so that a volume of the light to reach the base surface 706 could increase. As a result, it is possible to improve transmission efficiency. Additionally, FIG. 36A and FIG. 36B show a comparison with the same ray of light emitted from the light emitting element 8.

Then, the following is concerned with a method of producing the light source combined optically with the directivity structure 701 including the mesa structure.

Figure 37:
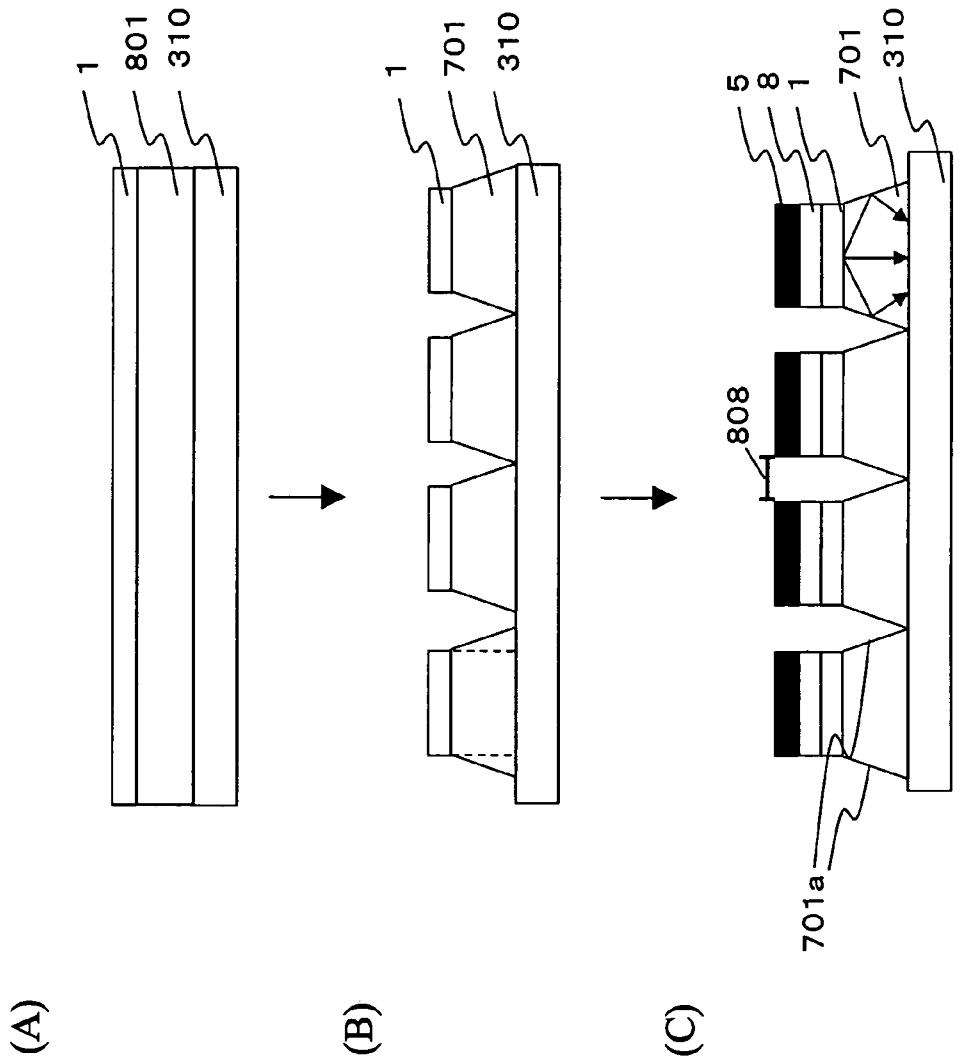
FIG. 37 shows steps (A) to (c) for producing the light source in embodiment 13.

A directivity imparting layer 801 is formed on light transmitting structure 310 as described in Embodiments 11 and 12, as shown in FIG. 37(A). This forming is performed by applying or evaporating a material to be the directivity imparting layer onto the light transmitting structure. On the directivity imparting layer 801, transparent electrode layer 2 is applied or evaporated in the same way. Additionally, the directivity imparting layer 801 is made of a material such as acrylic and polyarylate, for example.

After the directivity imparting layer 801 and the transparent electrode layer 2 are formed on the light transmitting structure 310, etching is performed for forming a small projection as described in Embodiment 5. According to these steps, a directivity imparting structure 801 with a mesa structure and the transparent electrode element 1 are formed simultaneously as shown in FIG. 37(B).

Next, on the transparent electrode element 1 shown in FIG. 37(B), organic EL material to be the light emitting element 8 is evaporated, and then metal to be the metal electrode layer 5 is evaporated thereon.

Now, the directivity structure 701 is thicker than the transparent electrode element 1, the light emitting element 8, or the metal electrode layer 5. And, there are sections 808 without an upper surface corresponding to the directivity structure 701 between the transparent electrode elements 1. When the organic EL material and the metal are evaporated on an entire surface of the light transmitting structure 310 on which the directivity structure 701 with mesa structure and the transparent electrode element 1 formed after etching for obtaining the mesa structure, the organic EL material and metal evaporated on the section 808 flow down along side surface 701*a* of the directivity structure 701 and collect at a lower end part of the directivity structure 701. Accordingly, the organic EL material and the metal evaporated on each transparent electrode element 1 are separated from the organic EL material and metal evaporated on other transparent electrode elements 1.

Therefore, even if only each upper surface of the transparent electrode element 1 is not evaporated with the organic EL material and the metal, when the organic EL material and the metal are evaporated on the entire surface of the light transmitting structure 301, the light emitting element 8 and the metal electrode layer 5 are formed on each directivity structure 701. When the light emitting element 8 and the metal electrode layer 5 are formed by evaporating the organic EL material and the metal on the entire surface of the light transmitting structure 301, masking is not required for evaporation of the light emitting element 8 and the metal electrode layer 5. However, when the metal electrode layer 5 and the transparent electrode element 1 are short-circuited, the light emitting element 8 does not emit light. Accordingly, the metal electrode layer 5 may be formed by evaporating metal on only the upper surface of the light emitting element 8.

As described above, since the light transmitting structure, the directivity structure, and the light emitting layer are combined in one piece, a layer that has low directivity with a low refractive index does not exist between layers. According to such configuration, light from the light emitting element is transmitted directly to the light transmitting structure without passing through a low directivity layer. Therefore, most of the light can reach the photosensitive drum while maintaining sufficient luminous intensity without leakage as described above. In addition, the directivity structure in this embodiment steers (corrects) light from the light emitting element to a specific degree, and this makes it possible to let most of the light from the light emitting element reach the light transmitting structure. Moreover, light that has reached the light transmitting structure maintains the luminous intensity higher than that in Embodiments 11 and 12 because there is no layer without directivity.

Additionally, when a light source is provided with the directivity structure having the mesa structure, a light transmission efficiency between the organic EL layer and the photosensitive drum could be improved four times as high as a light source without the directivity structure.

It is not surprising that, if the directivity structure is used, a size of an angle aperture does not need to be large to improve the light transmission efficiency. And, a focal depth of the light transmitting structure remains deep. It is needless to say that the light source can form a latent image on the photosensitive drum exactly.

In the above description, the light source 200 of the image writing apparatus in this invention is applied to the color laser printer 100 of a tandem type. The light source of the image writing apparatus in this invention can be applied to a color laser printer except for the tandem type or a laser printer for monochrome printing.

INDUSTRIAL APPLICABILITY

Since the present invention can convert an advancing direction of light emitted from a light source of an image writing apparatus, it is not necessary to pay any attention to a direction of placing the light source and a direction of the emitted light. Therefore, the image writing apparatus of this invention can downsize a printer by disposing the light source to face a direction in which a sub-scanning dimension is short.

In addition, the light source of the image writing apparatus is provided with directivity structure for imparting directivity to light emitted from a light emitting element, whereby most of the light can be transmitted to the photosensitive drum through light transmitting structure without making an angle aperture of the light transmitting structure large. Accordingly, while maintaining a focal depth of the light transmitting structure deep, it is possible to improve light transmission efficiency between the light emitting element and the photosensitive drum, and to increase luminous intensity on the photosensitive drum. As a result, the light source of the image writing apparatus in this invention can be utilized as the light source to form a clear latent image on the photosensitive drum.

Moreover, since light emitted from a light emitting element with a large luminous area is condensed through a condensing structure, it is possible to obtain light with high luminous flux density by the condensing structure. Since the light source is provided with the condensing structure and a light emitting element extended in a sub-scanning direction, light emitted from the light emitting element can be condensed in the sub-scanning direction, and light with high luminous flux density can be obtained at short intervals in a main scanning direction. Therefore, the light source of the image writing apparatus in this invention is available for a light source to form a latent image with high resolution on a photosensitive drum.

Furthermore, since light transmitting structure, directivity structure, and a light emitting layer are combined in one piece, a layer that has low directivity with a low refractive index does not exist between layers. According to such configuration, light from a light emitting element is transmitted directly to light transmitting structure without passing through a layer with low directivity. Therefore, the light source of the image writing apparatus in this invention is available for a light source wherein most of light can reach a photosensitive drum while maintaining sufficient luminous intensity almost without total reflection.

The invention claimed is:

1. A light source for an image writing apparatus, comprising:

light emitting elements arranged on a substrate in a main scanning direction;

converting structures, disposed on said substrate so as to respectively correspond to said light emitting elements, for converting an advancing direction of light emitted in a direction perpendicular to the substrate from said light emitting elements to be in a direction parallel to said substrate; and light transmitting structure for transmitting light keeping the advancing direction of the light parallel to the substrate, the advancing direction of the light having been converted by said converting structures to be parallel to said substrate, to a photosensitive drum so as to form an image on the photosensitive drum.

2. The light source according to claim 1, wherein said converting structures are disposed on said substrate by being on said light emitting elements, respectively, such that said converting structures are for converting the advancing direction of the light emitted from said light emitting elements by having the light enter said converting structures without the light having passed through said substrate.

3. The light source according to claim 1, wherein said converting structures are disposed on said substrate by being on a surface of said substrate other than a surface of said substrate on which said light emitting elements are arranged, such that said converting structures are for converting the advancing direction of the light emitted from said light emitting elements by having the light enter said converting structures after the light has passed through said substrate.

4. The light source according to claim 1, wherein the image writing apparatus includes photosensitive drums arranged in series.

5. The light source according to claim 1, wherein said light emitting elements comprise an organic electro luminescence material.

6. A light source for an image writing apparatus, comprising:

converting structures on a substrate;

light emitting elements on said converting structures, respectively, and arranged in a main scanning direction of said substrate, for emitting light in a direction perpendicular to said substrate to said converting structures such that an advancing direction of the light is converted by said converting structures so as to be in a direction parallel to said substrate; and light transmitting structure for transmitting light keeping the advancing direction of the light parallel to the substrate, the advancing direction of the light having been converted by said converting structures to be parallel to said substrate, to a photosensitive drum so as to form an image on the photosensitive drum.

7. The light source according to claim 6, wherein the image writing apparatus includes photosensitive drums arranged in series.

8. The light source according to claim 6, wherein said light emitting elements comprise an organic electro luminescence material.

9. A light source for an image writing apparatus, comprising:

light emitting elements arranged on a substrate in a main scanning direction;

a converting structure, disposed on said substrate and common to said light emitting elements, for converting an advancing direction of light emitted in a direction perpendicular to the substrate from said light emitting elements to be in a direction parallel to said substrate; and light transmitting structure for transmitting light keeping the advancing direction of the light parallel to the substrate, the advancing direction of the light having been converted by said converting structure to be parallel to said substrate, to a photosensitive drum so as to form an image on the photosensitive drum.

10. The light source according to claim 9, wherein said converting structure is disposed on said substrate by being on said light emitting elements such that said converting structure corresponds to all said light emitting elements and is for converting the advancing direction of the light emitted from said light emitting elements by having the light enter said converting structure without the light having passed through said substrate.

11. The light source according to claim 9, wherein said converting structure is disposed on said substrate by being on a surface of said substrate other than a surface of said substrate on which said light emitting elements are arranged, such that said converting structure corresponds to all said light emitting elements and is for converting the advancing direction of the light emitted from said light emitting elements by having the light enter said converting structure after the light has passed through said substrate.

12. The light source according to claim 9, wherein the image writing apparatus includes photosensitive drums arranged in series.

13. The light source according to claim 9, wherein said light emitting elements comprise an organic electro luminescence material.

14. A light source for an image writing apparatus, comprising:

a converting structure on a substrate;

light emitting elements, on said converting structure and arranged in a main scanning direction of said substrate, for emitting light to said converting structure such that an advancing direction of the light emitted perpendicular to the substrate is converted by said converting structure so as to be in a direction parallel to said substrate; and light transmitting structure for transmitting light keeping the advancing direction of the light parallel to the substrate, the advancing direction of the light having been converted by said converting structure to be parallel to said substrate, to a photosensitive drum so as to form an image on the photosensitive drum.

15. The light source according to claim 14, wherein the image writing apparatus includes photosensitive drums arranged in series.

16. The light source according to claim 14, wherein said light emitting elements comprise an organic electro luminescence material.

* * * * *